United States Patent
Kuzuhara et al.

(10) Patent No.: US 10,473,929 B2
(45) Date of Patent: Nov. 12, 2019

(54) IMAGE PROJECTOR

(71) Applicant: Panasonic Intellectual Property Management Co., Ltd., Osaka (JP)

(72) Inventors: Satoshi Kuzuhara, Osaka (JP); Hiroaki Okayama, Nara (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/908,972

(22) Filed: Mar. 1, 2018

(65) Prior Publication Data
US 2018/0259770 A1 Sep. 13, 2018

(30) Foreign Application Priority Data
Mar. 8, 2017 (JP) .................. 2017-043903

(51) Int. Cl.
G02B 27/01 (2006.01)
G03B 21/28 (2006.01)
G06K 9/00 (2006.01)
G03B 21/14 (2006.01)

(52) U.S. Cl.
CPC ....... *G02B 27/0101* (2013.01); *G03B 21/142* (2013.01); *G03B 21/28* (2013.01); *G06K 9/0061* (2013.01); *G06K 9/00671* (2013.01); *G06K 9/00845* (2013.01); *B60K 2370/334* (2019.05); *G02B 2027/0123* (2013.01)

(58) Field of Classification Search
CPC .... H04N 9/31–3197; G02B 2027/0127; G02B 2027/0154; G02B 27/01–0189; G02B 2027/0105–0198; G03B 21/142; G03B 21/147; G03B 21/2066; G03B 21/28; G03B 21/145
See application file for complete search history.

(56) References Cited

U.S. PATENT DOCUMENTS

| | | | | |
|---|---|---|---|---|
| 5,995,130 A * | 11/1999 | Akatsu | ......... | G02B 26/123 347/239 |
| 6,177,966 B1 * | 1/2001 | Masuda | ......... | G02B 27/0172 349/8 |
| 2008/0309815 A1 * | 12/2008 | Nanjo | ......... | G02B 13/00 348/345 |
| 2009/0160736 A1 * | 6/2009 | Shikita | ......... | G02B 27/0101 345/7 |
| 2014/0036374 A1 * | 2/2014 | Lescure | ......... | G02B 27/0101 359/630 |

FOREIGN PATENT DOCUMENTS

| | | |
|---|---|---|
| JP | 6-087043 U | 12/1994 |
| JP | 2008-180759 | 8/2008 |

* cited by examiner

*Primary Examiner* — Cara E Rakowski
*Assistant Examiner* — Christopher A Lamb, II
(74) *Attorney, Agent, or Firm* — Greenblum & Bernstein, P.L.C.

(57) ABSTRACT

A head-up display includes a display device and a projection optical system. The projection optical system has a lens group including at least one lens element and projects onto a reflecting member an image displayed on the display device. The lens group includes a drive lens that shifts along an optical path to change its distance from the display device.

7 Claims, 24 Drawing Sheets

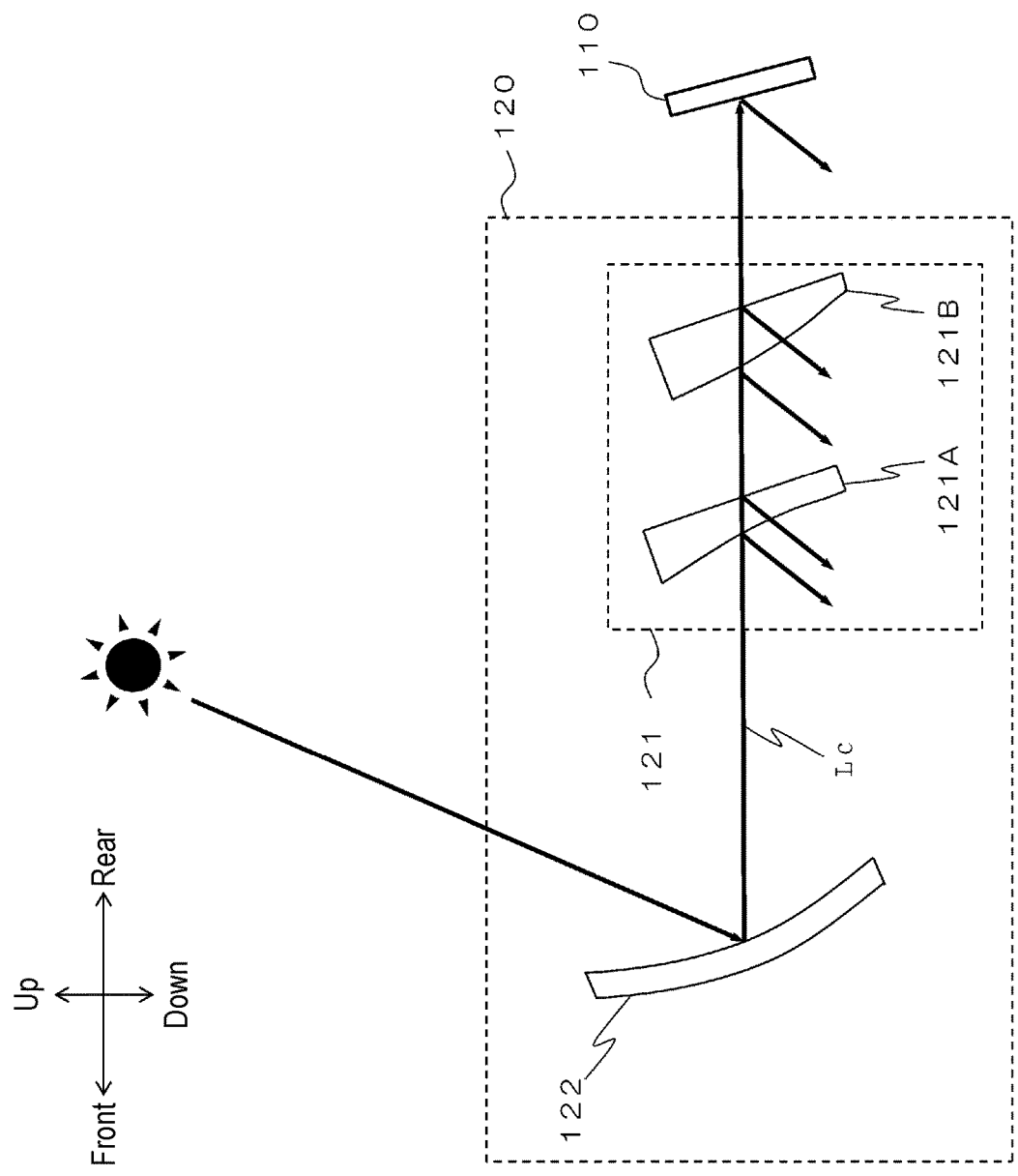

FIG. 9A
Before sight distance is increased     After sight distance is increased
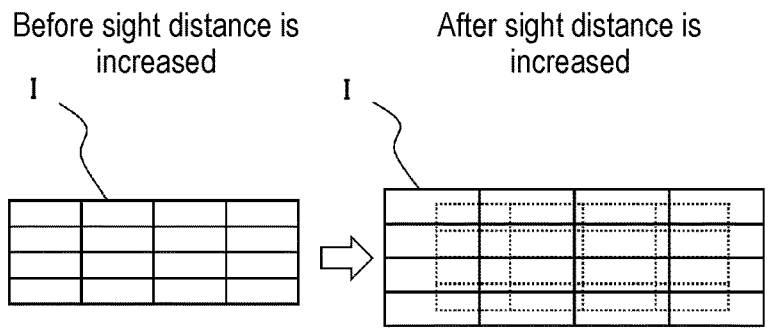
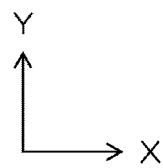
FIG. 9B
Before sight distance is increased     After sight distance is increased
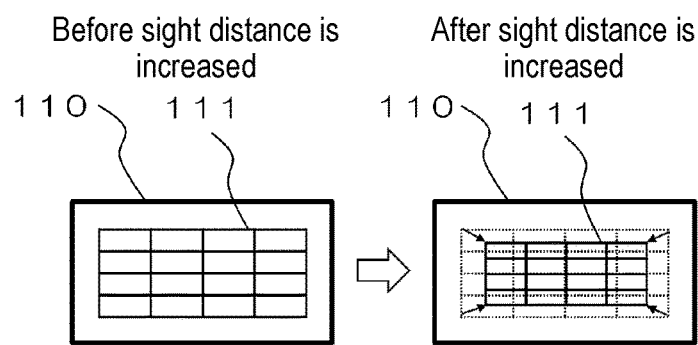
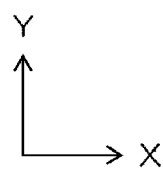

FIG. 11A
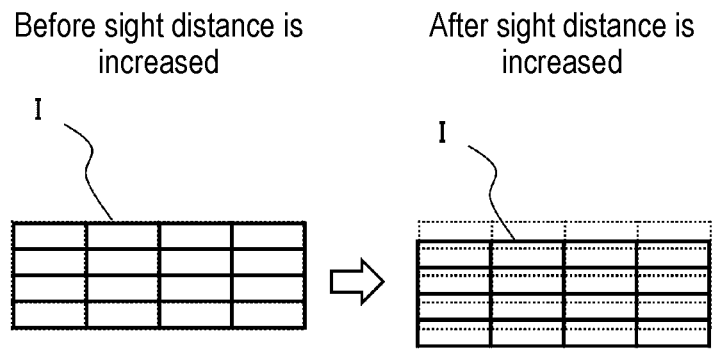
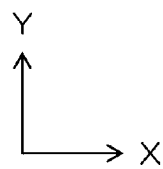
FIG. 11B
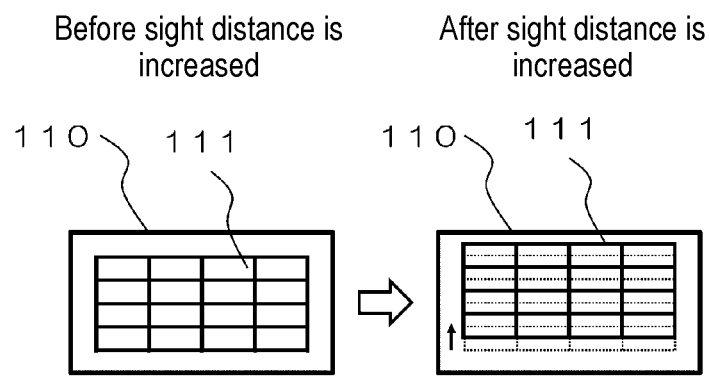
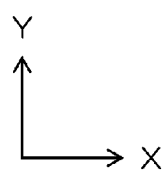

FIG. 13

| Surface number | Shape | Refractive index | Abbe number | Eccentricity data ||||||
|---|---|---|---|---|---|---|---|---|---|
| | | | | X | Y | Z | ADE | BDE | CDE |
| Screen 1 | | | | 0 | 0 | 0 | 0 | 0 | 0 |
| Fixed lens 2 | Free-form surface | 1.492 | 57.4 | 1.03743 | 4.55519 | -6.99626 | 1.8717 | -0.0312 | -0.9561 |
| Fixed lens 3 | Free-form surface | | | 1.03034 | 4.1306 | -19.9893 | 1.8717 | -0.0312 | -0.9561 |
| Drive lens 4 | Free-form surface | 1.492 | 57.4 | 4.549 | 16.619 | -65.458 | 1.978 | 3.534 | -2.467 |
| Drive lens 5 | Free-form surface | | | 4.795 | 16.481 | -69.448 | 1.978 | 3.534 | -2.467 |
| Mirror 6 | Free-form surface | | | 12.293 | 52.877 | -164.438 | 1.930 | 0.096 | 0.550 |
| Windshield 7 | Free-form surface | | | 41.379 | 152.941 | 42.499 | 141.640 | -7.753 | 16.345 |
| Viewer 8 | | | | -42.793 | -282.021 | 738.275 | 141.640 | -7.753 | 16.345 |

FIG. 14

| | Surface number | Shape | Refractive index | Abbe number | Eccentricity data | | | | | |
|---|---|---|---|---|---|---|---|---|---|---|
| | | | | | X | Y | Z | ADE | BDE | CDE |
| Screen | 1 | | | | 0 | 0 | 0 | 0 | 0 | 0 |
| Fixed lens | 2 | Free-form surface | 1.492 | 57.4 | 1.03743 | 4.55519 | -6.99626 | 1.8717 | -0.0312 | -0.9561 |
| | 3 | Free-form surface | | | 1.03034 | 4.1306 | -19.9893 | 1.8717 | -0.0312 | -0.9561 |
| Drive lens | 4 | Free-form surface | 1.492 | 57.4 | 1.988 | 4.861 | -32.583 | 1.978 | 3.534 | -2.467 |
| | 5 | Free-form surface | | | 2.235 | 4.723 | -36.573 | 1.978 | 3.534 | -2.467 |
| Mirror | 6 | Free-form surface | | | 12.293 | 52.877 | -164.438 | 1.930 | 0.096 | 0.550 |
| Windshield | 7 | Free-form surface | | | 41.379 | 152.941 | 42.499 | 141.640 | -7.753 | 16.345 |
| Viewer | 8 | | | | -42.793 | -282.021 | 738.275 | 141.640 | -7.753 | 16.345 |

FIG. 15

| Surface number | Radius of curvature |
|---|---|
| 2 | ∞ |
| 3 | ∞ |
| 4 | ∞ |
| 5 | −75.8 |
| 6 | 191.0 |
| 7 | −1472.5 |

FIG. 16

| Surface number | Polynomial coefficients | | | | | | | | |
|---|---|---|---|---|---|---|---|---|---|
| 2 | C1 | 0.000E+00 | C19 | 0.000E+00 | C37 | 0.000E+00 | C55 | 0.000E+00 |
| | C2 | 0.000E+00 | C20 | 0.000E+00 | C38 | 0.000E+00 | C56 | 0.000E+00 |
| | C3 | −2.122E−01 | C21 | 0.000E+00 | C39 | 0.000E+00 | C57 | 0.000E+00 |
| | C4 | 0.000E+00 | C22 | 0.000E+00 | C40 | 0.000E+00 | C58 | 0.000E+00 |
| | C5 | 0.000E+00 | C23 | 0.000E+00 | C41 | 0.000E+00 | C59 | 0.000E+00 |
| | C6 | −2.725E−03 | C24 | 0.000E+00 | C42 | 0.000E+00 | C60 | 0.000E+00 |
| | C7 | 0.000E+00 | C25 | 0.000E+00 | C43 | 0.000E+00 | C61 | 0.000E+00 |
| | C8 | 0.000E+00 | C26 | 0.000E+00 | C44 | 0.000E+00 | C62 | 0.000E+00 |
| | C9 | 0.000E+00 | C27 | 0.000E+00 | C45 | 0.000E+00 | C63 | 0.000E+00 |
| | C10 | 0.000E+00 | C28 | 0.000E+00 | C46 | 0.000E+00 | C64 | 0.000E+00 |
| | C11 | 0.000E+00 | C29 | 0.000E+00 | C47 | 0.000E+00 | C65 | 0.000E+00 |
| | C12 | 0.000E+00 | C30 | 0.000E+00 | C48 | 0.000E+00 | C66 | 0.000E+00 |
| | C13 | 0.000E+00 | C31 | 0.000E+00 | C49 | 0.000E+00 | | |
| | C14 | 0.000E+00 | C32 | 0.000E+00 | C50 | 0.000E+00 | | |
| | C15 | 0.000E+00 | C33 | 0.000E+00 | C51 | 0.000E+00 | | |
| | C16 | 0.000E+00 | C34 | 0.000E+00 | C52 | 0.000E+00 | | |
| | C17 | 0.000E+00 | C35 | 0.000E+00 | C53 | 0.000E+00 | | |
| | C18 | 0.000E+00 | C36 | 0.000E+00 | C54 | 0.000E+00 | | |
| 3 | C1 | 0.000E+00 | C19 | 0.000E+00 | C37 | 0.000E+00 | C55 | 0.000E+00 |
| | C2 | 0.000E+00 | C20 | 0.000E+00 | C38 | 0.000E+00 | C56 | 0.000E+00 |
| | C3 | −2.122E−01 | C21 | 0.000E+00 | C39 | 0.000E+00 | C57 | 0.000E+00 |
| | C4 | 0.000E+00 | C22 | 0.000E+00 | C40 | 0.000E+00 | C58 | 0.000E+00 |
| | C5 | 0.000E+00 | C23 | 0.000E+00 | C41 | 0.000E+00 | C59 | 0.000E+00 |
| | C6 | −2.725E−03 | C24 | 0.000E+00 | C42 | 0.000E+00 | C60 | 0.000E+00 |
| | C7 | 0.000E+00 | C25 | 0.000E+00 | C43 | 0.000E+00 | C61 | 0.000E+00 |
| | C8 | 0.000E+00 | C26 | 0.000E+00 | C44 | 0.000E+00 | C62 | 0.000E+00 |
| | C9 | 0.000E+00 | C27 | 0.000E+00 | C45 | 0.000E+00 | C63 | 0.000E+00 |
| | C10 | 0.000E+00 | C28 | 0.000E+00 | C46 | 0.000E+00 | C64 | 0.000E+00 |
| | C11 | 0.000E+00 | C29 | 0.000E+00 | C47 | 0.000E+00 | C65 | 0.000E+00 |
| | C12 | 0.000E+00 | C30 | 0.000E+00 | C48 | 0.000E+00 | C66 | 0.000E+00 |
| | C13 | 0.000E+00 | C31 | 0.000E+00 | C49 | 0.000E+00 | | |
| | C14 | 0.000E+00 | C32 | 0.000E+00 | C50 | 0.000E+00 | | |
| | C15 | 0.000E+00 | C33 | 0.000E+00 | C51 | 0.000E+00 | | |
| | C16 | 0.000E+00 | C34 | 0.000E+00 | C52 | 0.000E+00 | | |
| | C17 | 0.000E+00 | C35 | 0.000E+00 | C53 | 0.000E+00 | | |
| | C18 | 0.000E+00 | C36 | 0.000E+00 | C54 | 0.000E+00 | | |

FIG. 17

| Surface number | Polynomial coefficients | | | | | | | |
|---|---|---|---|---|---|---|---|---|
| 4 | C1 | 0.000E+00 | C19 | 0.000E+00 | C37 | 0.000E+00 | C55 | 0.000E+00 |
| | C2 | 0.000E+00 | C20 | 0.000E+00 | C38 | 0.000E+00 | C56 | 0.000E+00 |
| | C3 | 0.000E+00 | C21 | 0.000E+00 | C39 | 0.000E+00 | C57 | 0.000E+00 |
| | C4 | 7.153E−03 | C22 | 0.000E+00 | C40 | 0.000E+00 | C58 | 0.000E+00 |
| | C5 | 0.000E+00 | C23 | 0.000E+00 | C41 | 0.000E+00 | C59 | 0.000E+00 |
| | C6 | 0.000E+00 | C24 | 0.000E+00 | C42 | 0.000E+00 | C60 | 0.000E+00 |
| | C7 | 0.000E+00 | C25 | 0.000E+00 | C43 | 0.000E+00 | C61 | 0.000E+00 |
| | C8 | 0.000E+00 | C26 | 0.000E+00 | C44 | 0.000E+00 | C62 | 0.000E+00 |
| | C9 | 0.000E+00 | C27 | 0.000E+00 | C45 | 0.000E+00 | C63 | 0.000E+00 |
| | C10 | 0.000E+00 | C28 | 0.000E+00 | C46 | 0.000E+00 | C64 | 0.000E+00 |
| | C11 | 4.198E−07 | C29 | 0.000E+00 | C47 | 0.000E+00 | C65 | 0.000E+00 |
| | C12 | 0.000E+00 | C30 | 0.000E+00 | C48 | 0.000E+00 | C66 | 0.000E+00 |
| | C13 | 0.000E+00 | C31 | 0.000E+00 | C49 | 0.000E+00 | | |
| | C14 | 0.000E+00 | C32 | 0.000E+00 | C50 | 0.000E+00 | | |
| | C15 | 0.000E+00 | C33 | 0.000E+00 | C51 | 0.000E+00 | | |
| | C16 | 0.000E+00 | C34 | 0.000E+00 | C52 | 0.000E+00 | | |
| | C17 | 0.000E+00 | C35 | 0.000E+00 | C53 | 0.000E+00 | | |
| | C18 | 0.000E+00 | C36 | 0.000E+00 | C54 | 0.000E+00 | | |
| 5 | C1 | 0.000E+00 | C19 | −1.641E−08 | C37 | 0.000E+00 | C55 | 0.000E+00 |
| | C2 | 0.000E+00 | C20 | −2.309E−09 | C38 | 0.000E+00 | C56 | 0.000E+00 |
| | C3 | −2.077E−01 | C21 | 7.971E−10 | C39 | 0.000E+00 | C57 | 0.000E+00 |
| | C4 | 6.284E−03 | C22 | 6.649E−11 | C40 | 0.000E+00 | C58 | 0.000E+00 |
| | C5 | −1.281E−04 | C23 | −2.048E−11 | C41 | 0.000E+00 | C59 | 0.000E+00 |
| | C6 | 3.214E−03 | C24 | 2.572E−10 | C42 | 0.000E+00 | C60 | 0.000E+00 |
| | C7 | 3.385E−07 | C25 | 1.641E−11 | C43 | 0.000E+00 | C61 | 0.000E+00 |
| | C8 | 6.373E−05 | C26 | 3.992E−10 | C44 | 0.000E+00 | C62 | 0.000E+00 |
| | C9 | 2.760E−06 | C27 | −8.173E−12 | C45 | 0.000E+00 | C63 | 0.000E+00 |
| | C10 | 7.316E−05 | C28 | 2.524E−10 | C46 | 0.000E+00 | C64 | 0.000E+00 |
| | C11 | 1.626E−07 | C29 | 0.000E+00 | C47 | 0.000E+00 | C65 | 0.000E+00 |
| | C12 | 7.428E−08 | C30 | 0.000E+00 | C48 | 0.000E+00 | C66 | 0.000E+00 |
| | C13 | 1.510E−07 | C31 | 0.000E+00 | C49 | 0.000E+00 | | |
| | C14 | −8.688E−09 | C32 | 0.000E+00 | C50 | 0.000E+00 | | |
| | C15 | −5.575E−07 | C33 | 0.000E+00 | C51 | 0.000E+00 | | |
| | C16 | 1.045E−10 | C34 | 0.000E+00 | C52 | 0.000E+00 | | |
| | C17 | −3.894E−09 | C35 | 0.000E+00 | C53 | 0.000E+00 | | |
| | C18 | −6.144E−10 | C36 | 0.000E+00 | C54 | 0.000E+00 | | |

FIG. 18

| Surface number | Polynomial coefficients | | | | | | |
|---|---|---|---|---|---|---|---|
| 6 | C1 | 0.000E+00 | C19 | -1.761E-11 | C37 | 0.000E+00 | C55 | 0.000E+00 |
| | C2 | 0.000E+00 | C20 | -3.020E-12 | C38 | 0.000E+00 | C56 | 0.000E+00 |
| | C3 | 0.000E+00 | C21 | -6.723E-11 | C39 | 0.000E+00 | C57 | 0.000E+00 |
| | C4 | -1.236E-03 | C22 | -3.956E-13 | C40 | 0.000E+00 | C58 | 0.000E+00 |
| | C5 | -7.919E-05 | C23 | 1.044E-15 | C41 | 0.000E+00 | C59 | 0.000E+00 |
| | C6 | -1.387E-03 | C24 | -1.065E-12 | C42 | 0.000E+00 | C60 | 0.000E+00 |
| | C7 | -1.677E-07 | C25 | 2.500E-14 | C43 | 0.000E+00 | C61 | 0.000E+00 |
| | C8 | -1.048E-06 | C26 | -8.703E-13 | C44 | 0.000E+00 | C62 | 0.000E+00 |
| | C9 | -1.293E-07 | C27 | 4.837E-14 | C45 | 0.000E+00 | C63 | 0.000E+00 |
| | C10 | -7.890E-07 | C28 | -5.637E-13 | C46 | 0.000E+00 | C64 | 0.000E+00 |
| | C11 | -1.402E-08 | C29 | -1.270E-16 | C47 | 0.000E+00 | C65 | 0.000E+00 |
| | C12 | -6.539E-11 | C30 | -8.049E-16 | C48 | 0.000E+00 | C66 | 0.000E+00 |
| | C13 | -2.935E-08 | C31 | -1.188E-16 | C49 | 0.000E+00 | | |
| | C14 | -4.412E-10 | C32 | -1.332E-16 | C50 | 0.000E+00 | | |
| | C15 | -1.445E-08 | C33 | -7.653E-16 | C51 | 0.000E+00 | | |
| | C16 | 2.914E-13 | C34 | -3.616E-15 | C52 | 0.000E+00 | | |
| | C17 | -4.002E-12 | C35 | 6.237E-16 | C53 | 0.000E+00 | | |
| | C18 | -1.769E-12 | C36 | 1.216E-14 | C54 | 0.000E+00 | | |
| 7 | C1 | 0.000E+00 | C19 | -1.430E-13 | C37 | 0.000E+00 | C55 | 0.000E+00 |
| | C2 | 2.424E-01 | C20 | 7.920E-15 | C38 | 0.000E+00 | C56 | 0.000E+00 |
| | C3 | 1.399E+00 | C21 | 1.670E-14 | C39 | 0.000E+00 | C57 | 0.000E+00 |
| | C4 | -6.100E-05 | C22 | 7.130E-17 | C40 | 0.000E+00 | C58 | 0.000E+00 |
| | C5 | -1.880E-06 | C23 | 1.320E-16 | C41 | 0.000E+00 | C59 | 0.000E+00 |
| | C6 | 7.680E-05 | C24 | -1.470E-16 | C42 | 0.000E+00 | C60 | 0.000E+00 |
| | C7 | 2.960E-07 | C25 | 2.340E-16 | C43 | 0.000E+00 | C61 | 0.000E+00 |
| | C8 | 2.300E-08 | C26 | 3.060E-16 | C44 | 0.000E+00 | C62 | 0.000E+00 |
| | C9 | 1.610E-07 | C27 | 6.610E-17 | C45 | 0.000E+00 | C63 | 0.000E+00 |
| | C10 | 1.160E-07 | C28 | 1.000E-17 | C46 | 0.000E+00 | C64 | 0.000E+00 |
| | C11 | -1.940E-10 | C29 | 0.000E+00 | C47 | 0.000E+00 | C65 | 0.000E+00 |
| | C12 | -1.620E-10 | C30 | 0.000E+00 | C48 | 0.000E+00 | C66 | 0.000E+00 |
| | C13 | -5.070E-11 | C31 | 0.000E+00 | C49 | 0.000E+00 | | |
| | C14 | -5.930E-11 | C32 | 0.000E+00 | C50 | 0.000E+00 | | |
| | C15 | -3.630E-12 | C33 | 0.000E+00 | C51 | 0.000E+00 | | |
| | C16 | 4.330E-14 | C34 | 0.000E+00 | C52 | 0.000E+00 | | |
| | C17 | 2.810E-13 | C35 | 0.000E+00 | C53 | 0.000E+00 | | |
| | C18 | -1.320E-13 | C36 | 0.000E+00 | C54 | 0.000E+00 | | |

FIG. 19

|  | Surface number | Shape | Refractive index | Abbe number | Eccentricity data ||||||
|---|---|---|---|---|---|---|---|---|---|---|
|  |  |  |  |  | X | Y | Z | ADE | BDE | CDE |
| Screen | 1 |  |  |  | 0 | 0 | 0 | 0 | 0 | 0 |
| Fixed lens | 2 | Free-form surface | 1.492 | 57.4 | 0.3119 | 12.0299 | -30.9043 | 4.4972 | -0.2291 | -1.4288 |
|  | 3 | Free-form surface |  |  | 0.28791 | 11.55944 | -36.8858 | 4.4972 | -0.2291 | -1.4288 |
| Drive lens | 4 | Free-form surface | 1.492 | 57.4 | 0.302 | 12.361 | -39.777 | 4.497 | -0.229 | -1.429 |
|  | 5 | Free-form surface |  |  | 0.222 | 10.793 | -59.715 | 4.497 | -0.229 | -1.429 |
| Mirror | 6 | Free-form surface |  |  | 0.866 | 46.862 | -189.806 | 7.870 | -0.313 | -0.535 |
| Windshield | 7 | Free-form surface |  |  | 17.174 | 169.923 | 5.826 | 147.709 | -9.939 | 13.843 |
| Viewer | 8 |  |  |  | -101.974 | -185.724 | 740.469 | 147.709 | -9.939 | 13.843 |

FIG. 20

| | Surface number | Shape | Refractive index | Abbe number | Eccentricity data | | | | | |
|---|---|---|---|---|---|---|---|---|---|---|
| | | | | | X | Y | Z | ADE | BDE | CDE |
| Screen | 1 | | | | 0 | 0 | 0 | 0 | 0 | 0 |
| Fixed lens | 2 | Free-form surface | 1.492 | 57.4 | 0.3119 | 12.0299 | -30.9043 | 4.4972 | -0.2291 | -1.4288 |
| | 3 | Free-form surface | | | 0.28791 | 11.55944 | -36.8858 | 4.4972 | -0.2291 | -1.4288 |
| Drive lens | 4 | Free-form surface | 1.492 | 57.4 | 0.469 | 21.712 | -73.504 | 4.497 | -0.229 | -1.429 |
| | 5 | Free-form surface | | | 0.389 | 20.144 | -93.442 | 4.497 | -0.229 | -1.429 |
| Mirror | 6 | Free-form surface | | | 0.866 | 46.862 | -189.806 | 7.870 | -0.313 | -0.535 |
| Windshield | 7 | Free-form surface | | | 17.174 | 169.923 | 5.826 | 147.709 | -9.939 | 13.843 |
| Viewer | 8 | | | | -101.974 | -185.724 | 740.469 | 147.709 | -9.939 | 13.843 |

FIG. 21

| Surface number | Radius of curvature |
|---|---|
| 2 | 123.9 |
| 3 | ∞ |
| 4 | ∞ |
| 5 | 111.2 |
| 6 | 197.2 |
| 7 | −1472.5 |

FIG. 22

| Surface number | Polynomial coefficients | | | | | | | | |
|---|---|---|---|---|---|---|---|---|---|
| 2 | C1 | 0.000E+00 | C19 | 0.000E+00 | C37 | 0.000E+00 | C55 | 0.000E+00 |
| | C2 | 0.000E+00 | C20 | 0.000E+00 | C38 | 0.000E+00 | C56 | 0.000E+00 |
| | C3 | −2.339E−01 | C21 | 0.000E+00 | C39 | 0.000E+00 | C57 | 0.000E+00 |
| | C4 | 1.727E−03 | C22 | 0.000E+00 | C40 | 0.000E+00 | C58 | 0.000E+00 |
| | C5 | 1.082E−03 | C23 | 0.000E+00 | C41 | 0.000E+00 | C59 | 0.000E+00 |
| | C6 | −2.868E−03 | C24 | 0.000E+00 | C42 | 0.000E+00 | C60 | 0.000E+00 |
| | C7 | 8.270E−06 | C25 | 0.000E+00 | C43 | 0.000E+00 | C61 | 0.000E+00 |
| | C8 | −1.380E−04 | C26 | 0.000E+00 | C44 | 0.000E+00 | C62 | 0.000E+00 |
| | C9 | −3.166E−05 | C27 | 0.000E+00 | C45 | 0.000E+00 | C63 | 0.000E+00 |
| | C10 | −2.932E−05 | C28 | 0.000E+00 | C46 | 0.000E+00 | C64 | 0.000E+00 |
| | C11 | −3.754E−07 | C29 | 0.000E+00 | C47 | 0.000E+00 | C65 | 0.000E+00 |
| | C12 | −4.856E−07 | C30 | 0.000E+00 | C48 | 0.000E+00 | C66 | 0.000E+00 |
| | C13 | 1.174E−06 | C31 | 0.000E+00 | C49 | 0.000E+00 | | |
| | C14 | 5.879E−07 | C32 | 0.000E+00 | C50 | 0.000E+00 | | |
| | C15 | −2.729E−07 | C33 | 0.000E+00 | C51 | 0.000E+00 | | |
| | C16 | 0.000E+00 | C34 | 0.000E+00 | C52 | 0.000E+00 | | |
| | C17 | 0.000E+00 | C35 | 0.000E+00 | C53 | 0.000E+00 | | |
| | C18 | 0.000E+00 | C36 | 0.000E+00 | C54 | 0.000E+00 | | |
| 3 | C1 | 0.000E+00 | C19 | 0.000E+00 | C37 | 0.000E+00 | C55 | 0.000E+00 |
| | C2 | 0.000E+00 | C20 | 0.000E+00 | C38 | 0.000E+00 | C56 | 0.000E+00 |
| | C3 | −2.339E−01 | C21 | 0.000E+00 | C39 | 0.000E+00 | C57 | 0.000E+00 |
| | C4 | 1.727E−03 | C22 | 0.000E+00 | C40 | 0.000E+00 | C58 | 0.000E+00 |
| | C5 | 1.082E−03 | C23 | 0.000E+00 | C41 | 0.000E+00 | C59 | 0.000E+00 |
| | C6 | −2.868E−03 | C24 | 0.000E+00 | C42 | 0.000E+00 | C60 | 0.000E+00 |
| | C7 | 8.270E−06 | C25 | 0.000E+00 | C43 | 0.000E+00 | C61 | 0.000E+00 |
| | C8 | −1.380E−04 | C26 | 0.000E+00 | C44 | 0.000E+00 | C62 | 0.000E+00 |
| | C9 | −3.166E−05 | C27 | 0.000E+00 | C45 | 0.000E+00 | C63 | 0.000E+00 |
| | C10 | −2.932E−05 | C28 | 0.000E+00 | C46 | 0.000E+00 | C64 | 0.000E+00 |
| | C11 | −3.754E−07 | C29 | 0.000E+00 | C47 | 0.000E+00 | C65 | 0.000E+00 |
| | C12 | −4.856E−07 | C30 | 0.000E+00 | C48 | 0.000E+00 | C66 | 0.000E+00 |
| | C13 | 1.174E−06 | C31 | 0.000E+00 | C49 | 0.000E+00 | | |
| | C14 | 5.879E−07 | C32 | 0.000E+00 | C50 | 0.000E+00 | | |
| | C15 | −2.729E−07 | C33 | 0.000E+00 | C51 | 0.000E+00 | | |
| | C16 | 0.000E+00 | C34 | 0.000E+00 | C52 | 0.000E+00 | | |
| | C17 | 0.000E+00 | C35 | 0.000E+00 | C53 | 0.000E+00 | | |
| | C18 | 0.000E+00 | C36 | 0.000E+00 | C54 | 0.000E+00 | | |

FIG. 23

| Surface number | Polynomial coefficients | | | | | | | |
|---|---|---|---|---|---|---|---|---|
| 4 | C1 | 0.000E+00 | C19 | 0.000E+00 | C37 | 0.000E+00 | C55 | 0.000E+00 |
| | C2 | 0.000E+00 | C20 | 0.000E+00 | C38 | 0.000E+00 | C56 | 0.000E+00 |
| | C3 | 0.000E+00 | C21 | 0.000E+00 | C39 | 0.000E+00 | C57 | 0.000E+00 |
| | C4 | −6.114E−04 | C22 | 0.000E+00 | C40 | 0.000E+00 | C58 | 0.000E+00 |
| | C5 | 0.000E+00 | C23 | 0.000E+00 | C41 | 0.000E+00 | C59 | 0.000E+00 |
| | C6 | 0.000E+00 | C24 | 0.000E+00 | C42 | 0.000E+00 | C60 | 0.000E+00 |
| | C7 | 0.000E+00 | C25 | 0.000E+00 | C43 | 0.000E+00 | C61 | 0.000E+00 |
| | C8 | 0.000E+00 | C26 | 0.000E+00 | C44 | 0.000E+00 | C62 | 0.000E+00 |
| | C9 | 0.000E+00 | C27 | 0.000E+00 | C45 | 0.000E+00 | C63 | 0.000E+00 |
| | C10 | 0.000E+00 | C28 | 0.000E+00 | C46 | 0.000E+00 | C64 | 0.000E+00 |
| | C11 | 6.404E−08 | C29 | 0.000E+00 | C47 | 0.000E+00 | C65 | 0.000E+00 |
| | C12 | 0.000E+00 | C30 | 0.000E+00 | C48 | 0.000E+00 | C66 | 0.000E+00 |
| | C13 | 0.000E+00 | C31 | 0.000E+00 | C49 | 0.000E+00 | | |
| | C14 | 0.000E+00 | C32 | 0.000E+00 | C50 | 0.000E+00 | | |
| | C15 | 0.000E+00 | C33 | 0.000E+00 | C51 | 0.000E+00 | | |
| | C16 | 0.000E+00 | C34 | 0.000E+00 | C52 | 0.000E+00 | | |
| | C17 | 0.000E+00 | C35 | 0.000E+00 | C53 | 0.000E+00 | | |
| | C18 | 0.000E+00 | C36 | 0.000E+00 | C54 | 0.000E+00 | | |
| 5 | C1 | 0.000E+00 | C19 | 0.000E+00 | C37 | 0.000E+00 | C55 | 0.000E+00 |
| | C2 | 0.000E+00 | C20 | 0.000E+00 | C38 | 0.000E+00 | C56 | 0.000E+00 |
| | C3 | −2.293E−01 | C21 | 0.000E+00 | C39 | 0.000E+00 | C57 | 0.000E+00 |
| | C4 | −9.817E−04 | C22 | 0.000E+00 | C40 | 0.000E+00 | C58 | 0.000E+00 |
| | C5 | 2.039E−05 | C23 | 0.000E+00 | C41 | 0.000E+00 | C59 | 0.000E+00 |
| | C6 | −7.310E−04 | C24 | 0.000E+00 | C42 | 0.000E+00 | C60 | 0.000E+00 |
| | C7 | −2.094E−06 | C25 | 0.000E+00 | C43 | 0.000E+00 | C61 | 0.000E+00 |
| | C8 | −2.289E−05 | C26 | 0.000E+00 | C44 | 0.000E+00 | C62 | 0.000E+00 |
| | C9 | −2.778E−06 | C27 | 0.000E+00 | C45 | 0.000E+00 | C63 | 0.000E+00 |
| | C10 | −2.238E−05 | C28 | 0.000E+00 | C46 | 0.000E+00 | C64 | 0.000E+00 |
| | C11 | −7.611E−08 | C29 | 0.000E+00 | C47 | 0.000E+00 | C65 | 0.000E+00 |
| | C12 | 9.916E−09 | C30 | 0.000E+00 | C48 | 0.000E+00 | C66 | 0.000E+00 |
| | C13 | −5.536E−08 | C31 | 0.000E+00 | C49 | 0.000E+00 | | |
| | C14 | 6.753E−08 | C32 | 0.000E+00 | C50 | 0.000E+00 | | |
| | C15 | −2.529E−09 | C33 | 0.000E+00 | C51 | 0.000E+00 | | |
| | C16 | 0.000E+00 | C34 | 0.000E+00 | C52 | 0.000E+00 | | |
| | C17 | 0.000E+00 | C35 | 0.000E+00 | C53 | 0.000E+00 | | |
| | C18 | 0.000E+00 | C36 | 0.000E+00 | C54 | 0.000E+00 | | |

FIG. 24

| Surface number | Polynomial coefficients | | | | | | | | | |
|---|---|---|---|---|---|---|---|---|---|---|
| 6 | C1 | 0.000E+00 | C19 | −3.654E−11 | C37 | 0.000E+00 | C55 | 0.000E+00 |
| | C2 | 0.000E+00 | C20 | 2.419E−11 | C38 | 0.000E+00 | C56 | 0.000E+00 |
| | C3 | 0.000E+00 | C21 | −9.256E−11 | C39 | 0.000E+00 | C57 | 0.000E+00 |
| | C4 | −1.546E−03 | C22 | −4.011E−13 | C40 | 0.000E+00 | C58 | 0.000E+00 |
| | C5 | 2.648E−06 | C23 | 2.032E−14 | C41 | 0.000E+00 | C59 | 0.000E+00 |
| | C6 | −1.739E−03 | C24 | −1.501E−12 | C42 | 0.000E+00 | C60 | 0.000E+00 |
| | C7 | 2.300E−07 | C25 | −1.550E−13 | C43 | 0.000E+00 | C61 | 0.000E+00 |
| | C8 | −6.399E−07 | C26 | −9.493E−13 | C44 | 0.000E+00 | C62 | 0.000E+00 |
| | C9 | 2.198E−07 | C27 | 2.074E−13 | C45 | 0.000E+00 | C63 | 0.000E+00 |
| | C10 | −9.433E−07 | C28 | −1.169E−12 | C46 | 0.000E+00 | C64 | 0.000E+00 |
| | C11 | −1.519E−08 | C29 | 1.963E−16 | C47 | 0.000E+00 | C65 | 0.000E+00 |
| | C12 | 9.871E−12 | C30 | −1.454E−15 | C48 | 0.000E+00 | C66 | 0.000E+00 |
| | C13 | −2.966E−08 | C31 | −7.907E−16 | C49 | 0.000E+00 | | |
| | C14 | −1.832E−09 | C32 | −6.145E−15 | C50 | 0.000E+00 | | |
| | C15 | −1.716E−08 | C33 | −5.355E−15 | C51 | 0.000E+00 | | |
| | C16 | −3.005E−12 | C34 | −7.724E−15 | C52 | 0.000E+00 | | |
| | C17 | −1.723E−12 | C35 | −4.527E−15 | C53 | 0.000E+00 | | |
| | C18 | 2.229E−12 | C36 | 1.594E−14 | C54 | 0.000E+00 | | |
| 7 | C1 | 0.000E+00 | C19 | −1.430E−13 | C37 | 0.000E+00 | C55 | 0.000E+00 |
| | C2 | 2.424E−01 | C20 | 7.920E−15 | C38 | 0.000E+00 | C56 | 0.000E+00 |
| | C3 | 1.399E+00 | C21 | 1.670E−14 | C39 | 0.000E+00 | C57 | 0.000E+00 |
| | C4 | −6.100E−05 | C22 | 7.130E−17 | C40 | 0.000E+00 | C58 | 0.000E+00 |
| | C5 | −1.880E−06 | C23 | 1.320E−16 | C41 | 0.000E+00 | C59 | 0.000E+00 |
| | C6 | 7.680E−05 | C24 | −1.470E−16 | C42 | 0.000E+00 | C60 | 0.000E+00 |
| | C7 | 2.960E−07 | C25 | 2.340E−16 | C43 | 0.000E+00 | C61 | 0.000E+00 |
| | C8 | 2.300E−08 | C26 | 3.060E−16 | C44 | 0.000E+00 | C62 | 0.000E+00 |
| | C9 | 1.610E−07 | C27 | 6.610E−17 | C45 | 0.000E+00 | C63 | 0.000E+00 |
| | C10 | 1.160E−07 | C28 | 1.000E−17 | C46 | 0.000E+00 | C64 | 0.000E+00 |
| | C11 | −1.940E−10 | C29 | 0.000E+00 | C47 | 0.000E+00 | C65 | 0.000E+00 |
| | C12 | −1.620E−10 | C30 | 0.000E+00 | C48 | 0.000E+00 | C66 | 0.000E+00 |
| | C13 | −5.070E−11 | C31 | 0.000E+00 | C49 | 0.000E+00 | | |
| | C14 | −5.930E−11 | C32 | 0.000E+00 | C50 | 0.000E+00 | | |
| | C15 | −3.630E−12 | C33 | 0.000E+00 | C51 | 0.000E+00 | | |
| | C16 | 4.330E−14 | C34 | 0.000E+00 | C52 | 0.000E+00 | | |
| | C17 | 2.810E−13 | C35 | 0.000E+00 | C53 | 0.000E+00 | | |
| | C18 | −1.320E−13 | C36 | 0.000E+00 | C54 | 0.000E+00 | | |

IMAGE PROJECTOR

TECHNICAL FIELD

The present disclosure relates to an image projector that projects light onto a transmissive reflecting member to show a virtual image.

BACKGROUND ART

PTL 1 discloses a display device that is used in a vehicle to project a display image onto a windbreak glass assembled with a combiner. This display device for the vehicle includes a light-emitting display means that is placed below the windbreak glass. The light-emitting display means has a light source, a lens as a collimator, and a transmissive display body. According to vehicle speed, the light-emitting display means is moved back and forth along a direction of light emitted toward the combiner, thereby shifting an imaging position of a virtual image to be displayed.

PTL 2 discloses a display device that projects a display image onto a partially transmissive mirror. This display device includes a display panel that forms an image, a relay optical system that forms an intermediate image, and an imaging optical system that forms the intermediate image again. The relay optical system shifts a position of the intermediate image. Accordingly, a display position of the image that is formed by the imaging optical system is shifted.

CITATION LIST

Patent Literatures

PTL 1: Unexamined Japanese Utility Model Publication No. H06-087043
PTL 2: Unexamined Japanese Patent Publication No. 2008-180759

SUMMARY OF THE INVENTION

The present disclosure provides an image projector that is susceptible of position adjustment of a virtual image.

An image projector of the present disclosure is an image projector that projects an image onto a transmissive reflecting member to allow a viewer to visually recognize a virtual image. The image projector includes a display device and a projection optical system. The display device displays an image. The projection optical system has a lens group including at least one lens element and projects onto the transmissive reflecting member the image displayed on the display device. The lens group includes a drive lens that shifts along an optical path to change its distance from the display device. The image projector satisfies the relationship: $1 < \Delta D / \Delta L$, where Z1 is a sight distance of the virtual image before the drive lens is shifted, Z2 is a sight distance of the virtual image after the drive lens is shifted, $\Delta L$ is a shift amount of the drive lens, and $\Delta D$ is $1/Z1 - 1/Z2$.

The image projector of the present disclosure is susceptible of position adjustment of the virtual image.

BRIEF DESCRIPTION OF DRAWINGS

FIG. 7 is a schematic diagram illustrating an optical path of external light incident on the head-up display of the first exemplary embodiment.

FIG. 9A illustrates appearances of a virtual image before and after the drive lens is shifted without electronic correction to a display image in the head-up display of the present disclosure.

FIG. 9B illustrates appearances of a display image before and after the drive lens is shifted with electronic correction in the head-up display of the present disclosure.

FIG. 11A illustrates appearances of a virtual image before and after the drive lens is shifted without electronic correction to the display image in the head-up display of the present disclosure.

FIG. 11B illustrates appearances of a display image before and after the drive lens is shifted with electronic correction in the head-up display of the present disclosure.

FIG. 13 shows eccentricity data of each of surfaces when virtual image I of an optical system of Example 1 (corresponding to the first exemplary embodiment) is at a shortest sight distance.

FIG. 14 shows eccentricity data of each of the surfaces when virtual image I of the optical system of Example 1 (corresponding to the first exemplary embodiment) is at a longest sight distance.

FIG. 15 shows respective radii of curvature of the surfaces in the optical system of Example 1 (corresponding to the first exemplary embodiment).

FIG. 16 shows shape data of free-form surfaces in the optical system of Example 1 (corresponding to the first exemplary embodiment).

FIG. 17 shows shape data of free-form surfaces in the optical system of Example 1 (corresponding to the first exemplary embodiment).

FIG. 18 shows shape data of free-form surfaces in the optical system of Example 1 (corresponding to the first exemplary embodiment).

FIG. 19 shows eccentricity data of each of surfaces when virtual image I of an optical system of Example 2 (corresponding to the second exemplary embodiment) is at a shortest sight distance.

FIG. 20 shows eccentricity data of each of the surfaces when virtual image I of the optical system of Example 2 (corresponding to the second exemplary embodiment) is at a longest sight distance.

FIG. 21 shows respective radii of curvature of the surfaces in the optical system of Example 2 (corresponding to the second exemplary embodiment).

FIG. 22 shows shape data of free-form surfaces in the optical system of Example 2 (corresponding to the second exemplary embodiment).

FIG. 23 shows shape data of free-form surfaces in the optical system of Example 2 (corresponding to the second exemplary embodiment).

FIG. 24 shows shape data of free-form surfaces in the optical system of Example 2 (corresponding to the second exemplary embodiment).

DESCRIPTION OF EMBODIMENTS

Exemplary embodiments are hereinafter described in detail with reference to the accompanying drawings where appropriate. However, detailed descriptions that are more than necessary may be omitted. For example, there are cases where detailed description of well-known matters and repeated description of substantially the same structure are omitted. This is for the purpose of preventing the following description from needlessly having redundancy, thereby facilitating understanding by those skilled in the art.

It is to be noted that the accompanying drawings and the following description are provided to allow those skilled in the art to fully understand the present disclosure and thus are not intended to limit the subject matter as described in the appended claims.

First Exemplary Embodiment

The first exemplary embodiment is described below with reference to FIGS. 1 to 7.

[1-1. Structure]
[1-1-1. Overall Structure of Head-Up Display]

The concrete exemplary embodiments and Examples of head-up display 100 (an example of an image projector) of the present disclosure are described below with reference to the drawings.

Figure 1:
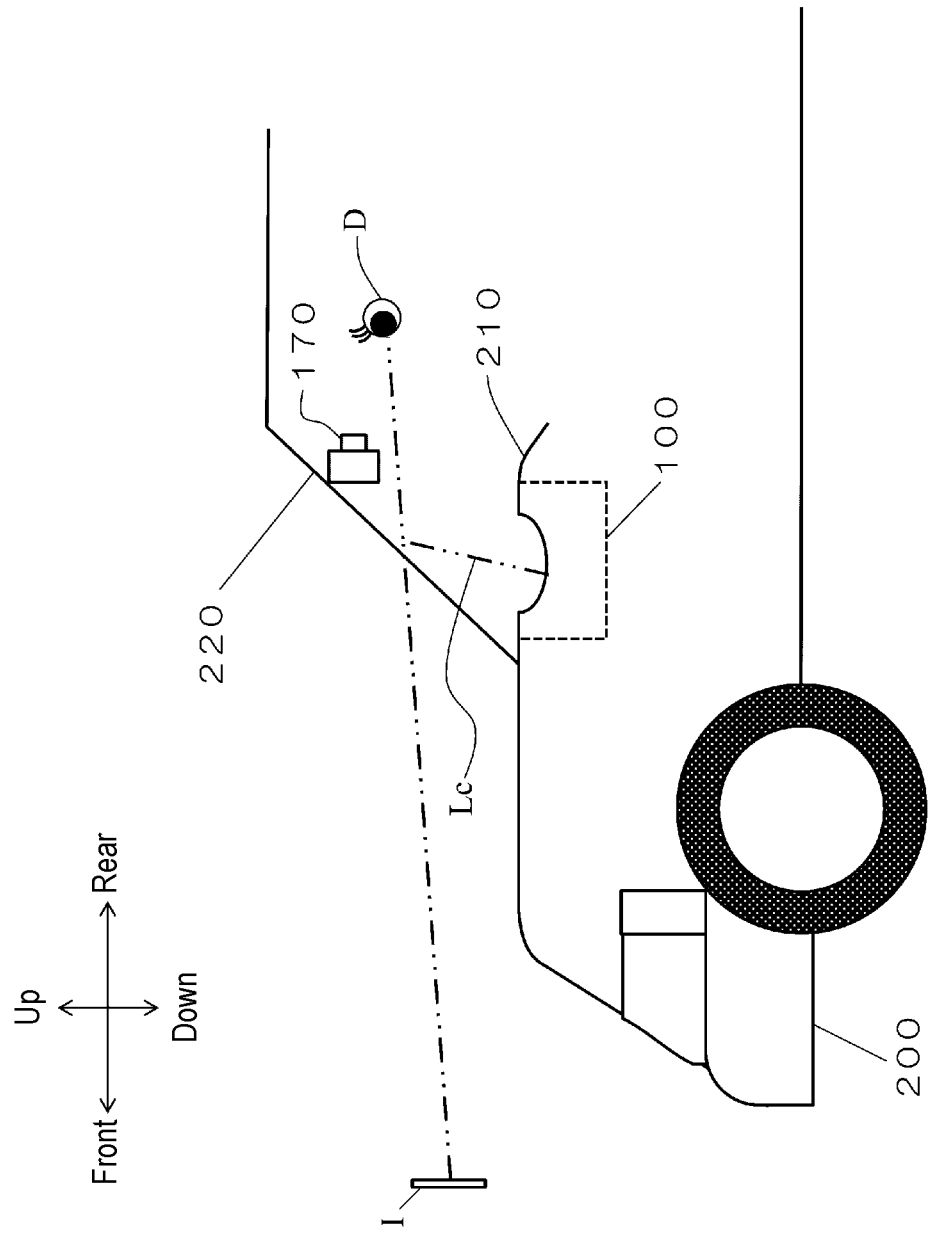
FIG. 1 is schematic diagram illustrating a vehicle equipped with a head-up display according to a first exemplary embodiment.

FIG. 1 schematically illustrates a section of vehicle 200 equipped with head-up display 100 of the present disclosure. As shown in FIG. 1, head-up display 100 is disposed in dashboard 210 that is positioned below windshield 220 of vehicle 200. Viewer D recognizes, as virtual image I, an image that is projected by head-up display 100 and is reflected off windshield 220. Vehicle 200 includes camera 170 that detects an eyepoint of viewer D.

Figure 2:
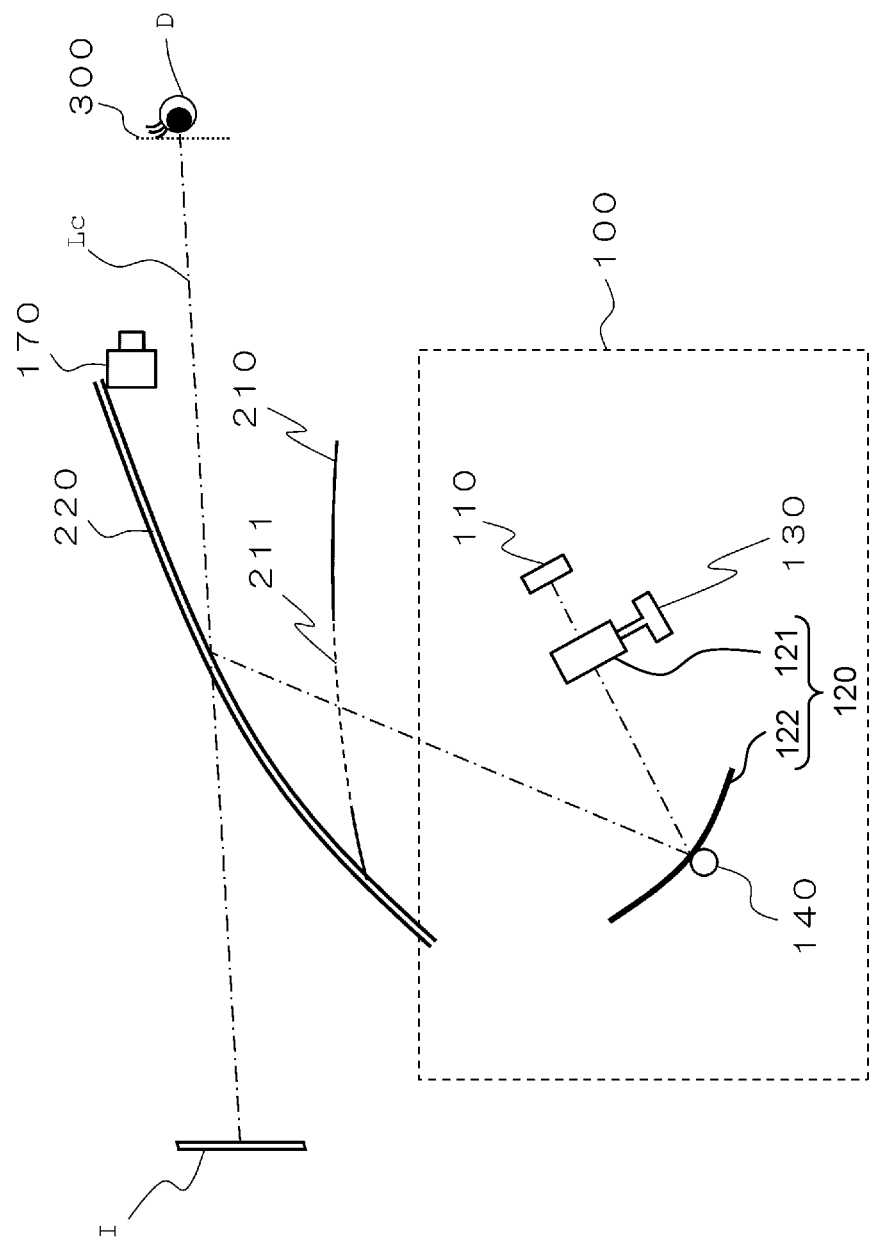
FIG. 2 is a schematic diagram illustrating structure of the head-up display according to the first exemplary embodiment.

FIG. 2 is a schematic diagram illustrating structure of head-up display 100 according to the present exemplary embodiment.

As shown in FIG. 2, head-up display 100 includes display device 110, projection optical system 120, lens drive unit 130, mirror drive unit 140, and controller 150. In head-up display 100, an image displayed by display device 110 is projected onto windshield 220 through opening 211 in dashboard 210. Projected light is reflected off windshield 220 and is guided to eyepoint region 300 of viewer D. In this way, head-up display 100 allows viewer D to visually recognize virtual image I.

It is to be noted here that in the present disclosure, "forward" indicates a direction toward windshield 220 of vehicle 200 as seen from viewer D. "Rearward" indicates a direction opposite to "forward". "Downward" indicates a direction toward ground on which vehicle 200 travels. "Upward" indicates a direction opposite to "downward". "Outer" indicates a left side as seen from viewer D in cases where vehicle 200 is a left-hand drive vehicle. Here "inner" indicates a right side as seen from viewer D. In cases where vehicle 200 is a right-hand drive vehicle, "outer" indicates a right side as seen from viewer D. Here "inner" indicates a left side as seen from viewer D. Eyepoint region 300 is a region where viewer D can visually recognize virtual image I that lacks for nothing.

Figure 6:
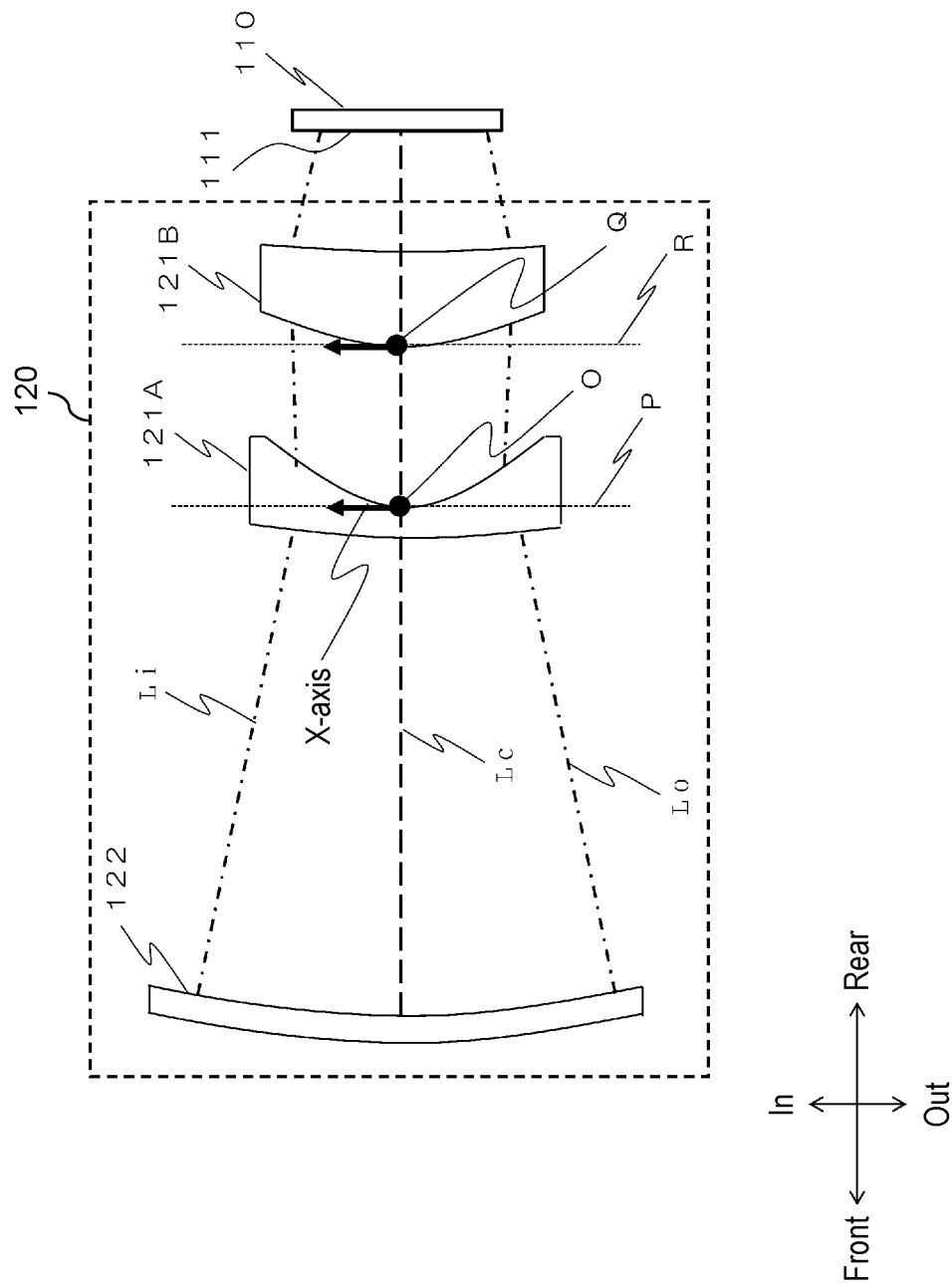
FIG. 6 illustrates the configuration of the projection optical system according to the first exemplary embodiment.
Figure 8A:
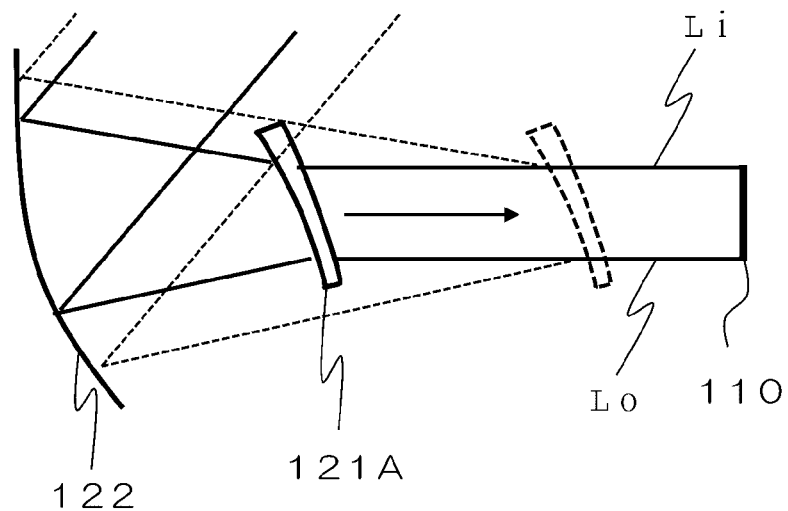
FIG. 8A illustrates an optical path of a display image before a drive lens is shifted in the head-up display of the present disclosure.
Figure 8B:
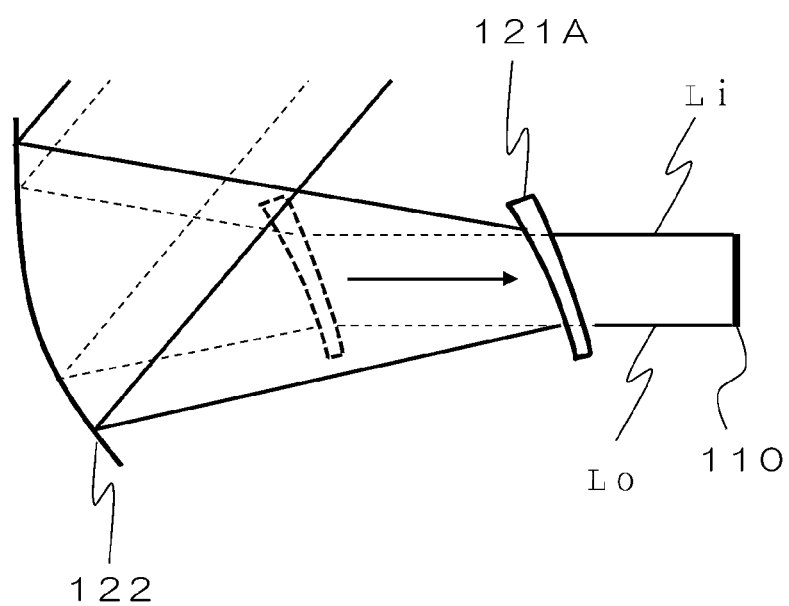
FIG. 8B illustrates an appearance of an optical path of the display image after the drive lens is shifted in the head-up display of the present disclosure.

As shown in FIG. 2, an optical path extending from a center of the image on display device 110 to the eyepoint of viewer D is regarded as reference beam Lc. This means that when seen from viewer D, reference beam Lc corresponds to an optical path extending from a center of virtual image I to the eyepoint of viewer D. On display device 110, a display position corresponding to a vehicular outer edge of virtual image I is regarded as a reference outer image edge. On display device 110, a display position corresponding to a vehicular inner edge of virtual image I is regarded as a reference inner image edge. As shown in FIGS. 6, 8A, and 8B, an optical path extending from the reference outer image edge of display device 110 to the eyepoint of viewer D is regarded as reference outer beam Lo. This means that an optical path of light corresponding to the vehicular outer edge of virtual image I is reference outer beam Lo. Similarly, an optical path extending from the reference inner image edge of display device 110 to the eyepoint of viewer D is regarded as reference inner beam Li. It is to be noted, however, that the eyepoint of viewer D is in a center of eyepoint region 300.

Display device 110 displays an image based on control by controller 150 (refer to FIG. 3), such as a central processing unit (CPU), that is described later. Examples of display device 110 that can be used include a backlit liquid crystal display, an organic light-emitting diode (electroluminescence), and a plasma display. With use of a digital micromirror device (DMD) or with use of a screen that diffuses or reflects light and a scanning laser as display device 110, an image may be generated. Various pieces of information that can be displayed by display device 110 based on control by controller 150 include a route guidance display, a distance to a vehicle ahead, remaining battery capacity of vehicle 200, and a current vehicle speed. Display device 110 enables viewer D to visually recognize satisfactory virtual image I by electronically pre-distorting an image and shifting an image display position in a displayable area of display device 110 according to distortion that takes place at projection optical system 120 and windshield 220 and a position of viewer D that is obtained by camera 170. To allow viewer D to visually recognize satisfactory virtual image I, display device 110 can also preshift, for display, respective display positions of display pixels having a plurality of wavelengths according to chromatic aberration that takes place, for example, at projection optical system 120.

Projection optical system 120 includes lens group 121 that is formed of not less than one lens element, and mirror 122 that has a concave reflection surface. Mirror 122 has positive power. Projection optical system 120 projects an image displayed by display device 110 onto windshield 220. Specifically, image light displayed by display device 110 is incident on mirror 122 through lens group 121. Mirror 122 reflects and projects the image light onto windshield 220.

Lens drive unit 130 is formed to include an actuator such as a motor, and a support frame that holds the lens element. The lens element of lens group 121 is partly or entirely driven along the optical path by lens drive unit 130 so that its distance from display device 110 changes, whereby virtual image I visually recognized by viewer D can be shifted a distance.

Mirror drive unit 140 is formed to include an actuator such as a motor, and a mirror support member. Mirror drive unit 140 rotates mirror 122 along two axes according to an eye position of viewer D, thereby shifting eyepoint region 300.

Controller 150 is an electronic control unit that controls head-up display 100.

Figure 3:
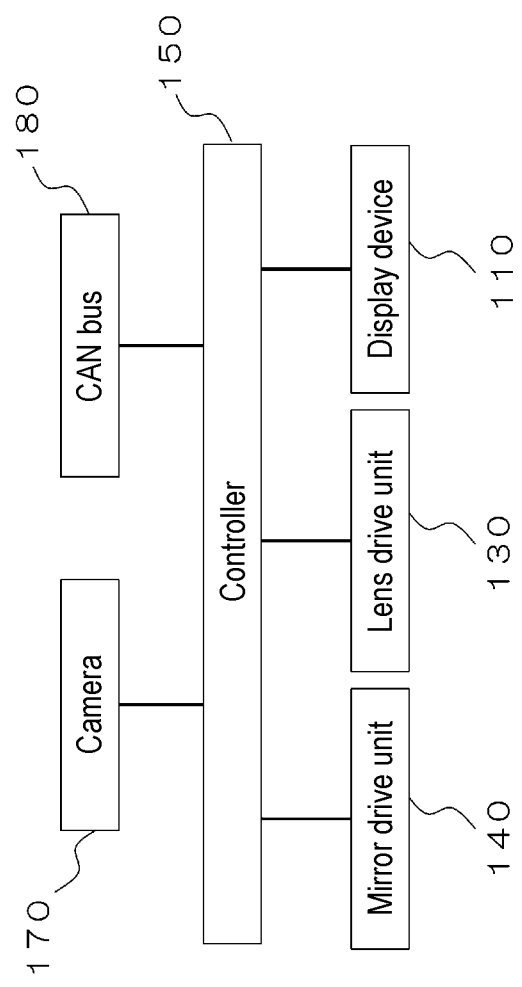
FIG. 3 is a block diagram illustrating a configuration of the head-up display according to the first exemplary embodiment.

FIG. 3 is a block diagram illustrating an electrical connection relationship in head-up display 100 according to the present exemplary embodiment. As shown in FIG. 3, controller 150 is connected to display device 110, lens drive unit 130, mirror drive unit 140, camera 170, and Controller Area Network (CAN) bus 180.

Controller 150 can determine eyepoint region 300 from the eye position of viewer D that is detected by camera 170.

CAN bus 180 is a data transmission bus used for transmitting information pieces such as speed and acceleration of vehicle 200, a steering angle of a steering, and a failure state of vehicle 200. Controller 150 obtains the various pieces of information on vehicle 200 through CAN bus 180.

According to driving of lens drive unit 130, controller 150 may change a size of the image displayed by display device 110, shift the image display position in the display area of display device 110 and drive mirror drive unit 140 for a change of angle of mirror 122. This is detailed later.

[1-1-2. Configuration of Projection Optical System]

A description is provided hereinafter of a configuration of projection optical system 120 with reference to FIGS. 4 to 7.

Figure 4:
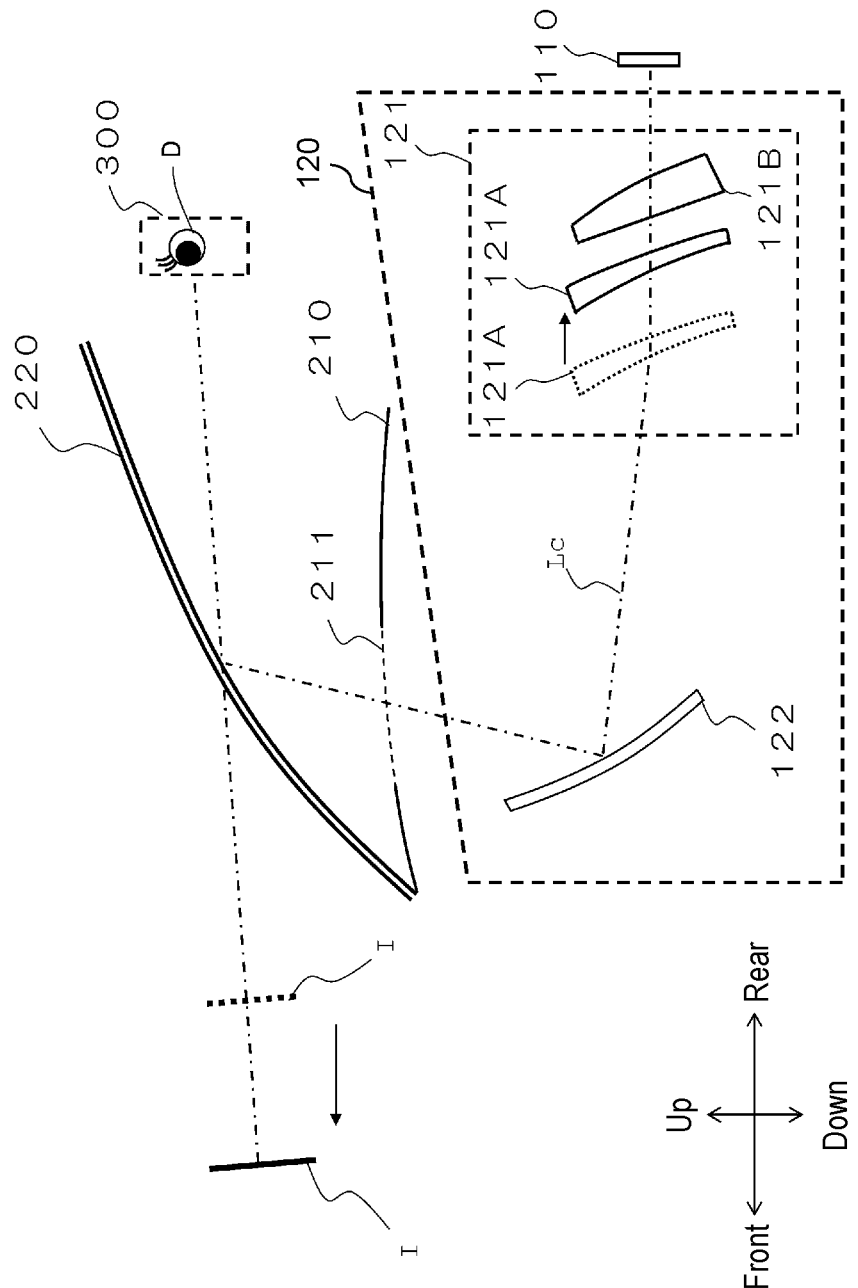
FIG. 4 is a schematic diagram illustrating the structure of the head-up display according to the first exemplary embodiment.

FIG. 4 is a schematic diagram illustrating the configuration of projection optical system 120 of head-up display 100 according to the present exemplary embodiment.

As shown in FIG. 4, lens group 121 is positioned forwardly of display device 110 in vehicle 200. Lens group 121 has, in order from display device 110 to mirror 122 along the optical path, fixed lens 121B that has a converging effect, and drive lens 121A that has a diverging effect. Drive lens 121A is such a free-form surface lens that its refracting interface has different curvatures along an X-axis and a Y-axis, respectively. Fixed lens 121B is such a free-form surface lens that its refracting interface has different curvatures along an X-axis and a Y-axis, respectively.

Figure 5:
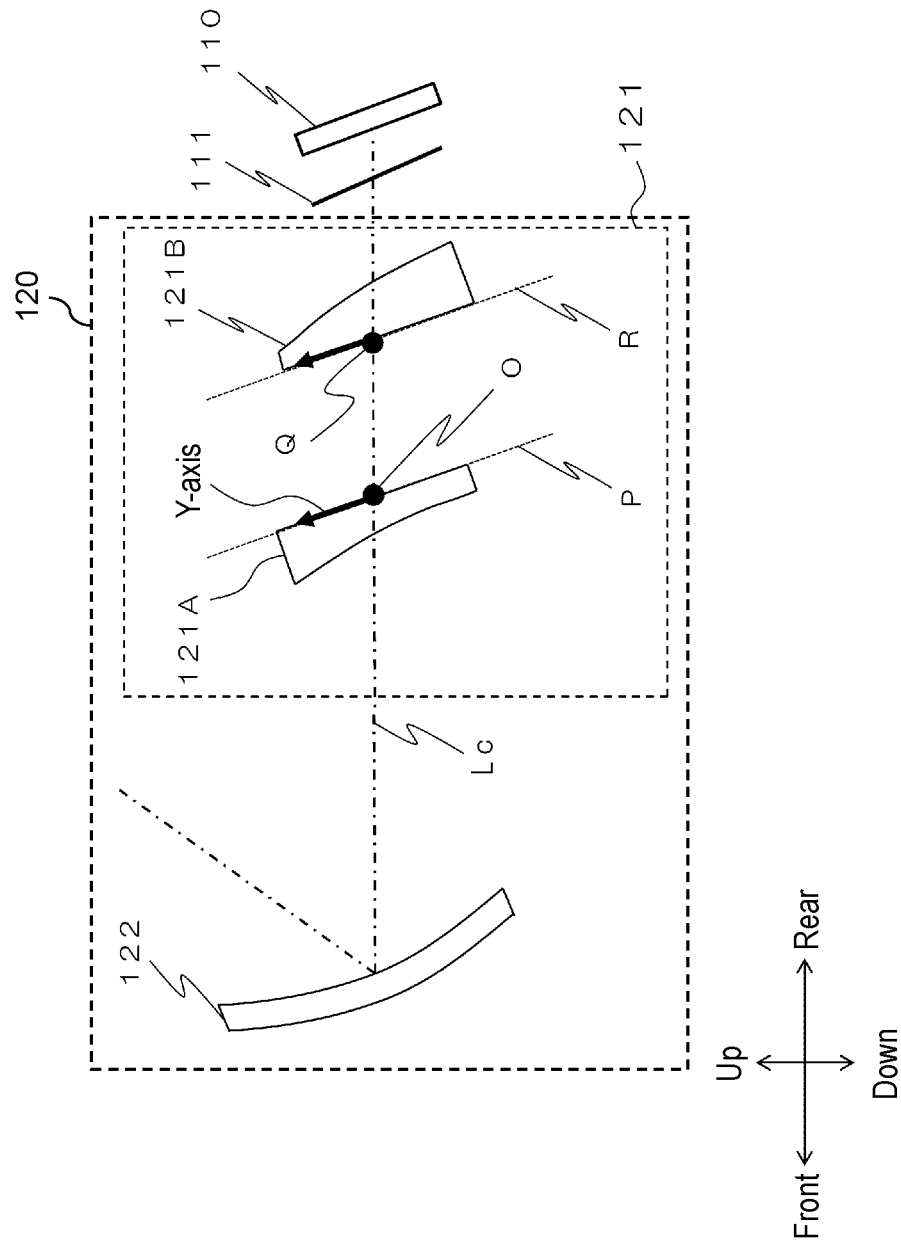
FIG. 5 is a schematic diagram illustrating a configuration of a projection optical system according to the first exemplary embodiment.

FIG. 5 is a schematic diagram illustrating a Y-axis configuration of projection optical system 120 according to the present exemplary embodiment. FIG. 6 is a schematic diagram illustrating an X-axis configuration of projection optical system 120 according to the present exemplary embodiment.

As shown in FIG. 5, a point of intersection of reference beam Lc and an incident surface of drive lens 121A is regarded as origin O. A plane tangent to the incident surface of drive lens 121A at origin O is regarded as tangent plane P. A straight line including a point of intersection of reference outer beam Lo and tangent plane P, and origin O is regarded as the X-axis. A straight line perpendicular to the X-axis on tangent plane P is regarded as the Y-axis. As shown in FIG. 6, a point of intersection of reference beam Lc and an emission surface of fixed lens 121B is regarded as origin Q. A plane tangent to the incident surface of fixed lens 121B at origin Q is regarded as tangent plane R. A straight line including a point of intersection of reference outer beam Lo and tangent plane R, and origin Q is regarded as the X-axis. A straight line perpendicular to the X-axis on tangent plane R is regarded as the Y-axis. While alignment is established between a vehicular inner-outer line and the X-axis in FIG. 5, it is to be noted that this alignment is not limiting. As shown in FIG. 5, drive lens 121A and fixed lens 121B are disposed to downwardly incline relative to reference beam Lc.

A description is provided first of drive lens 121A of the first exemplary embodiment. As shown in FIG. 5, the display-device 110-end surface (incident surface) of drive lens 121A is shaped to have no refractive power along its Y-axis. However, the incident surface of drive lens 121A may be of concave shape, convex shape or planar shape as long as its curvature along the X-axis is greater. A mirror 122-end surface (emission surface) of drive lens 121A is shaped concavely along its Y-axis. This means that drive lens 121A has only to have a diverging effect along its Y-axis.

As shown in FIG. 6, the display-device 110-end surface (incident surface) of drive lens 121A is shaped concavely along its X-axis to concavely face display device 110. On the other hand, the emission surface of drive lens 121A is shaped convexly along its X-axis to convexly face mirror 122. However, drive lens 121A has only to have a diverging effect along its X-axis, so that its emission surface may be shaped concavely along the X-axis to concavely face mirror 122.

In lens group 121, the curvature along the X-axis means a curvature of a sectional shape in a plane that includes the X-axis and is perpendicular to the Y-axis. The curvature along the Y-axis means a curvature of a sectional shape in a plane that includes the Y-axis and is perpendicular to the X-axis.

A description is provided next of fixed lens 121B. As shown in FIG. 5, the display-device 110-end surface (incident surface) of fixed lens 121B is shaped convexly along its Y-axis to convexly face display device 110. On the other hand, a mirror 122-end surface (emission surface) of fixed lens 121B is formed so that its curvature along the Y-axis is smaller than its curvature along the X-axis.

As shown in FIG. 6, the incident surface of fixed lens 121B is shaped concavely along the X-axis to concavely face display device 110. On the other hand, the emission surface of fixed lens 121B is shaped convexly along the X-axis to convexly face mirror 122.

FIG. 7 is a schematic diagram illustrating external light such as sunlight entering projection optical system 120. When the external light such as sunlight is incident on lens group 121 from mirror 122, the external light is reflected off the respective emission surfaces and the respective incident surfaces of drive lens 121A and fixed lens 121B of lens group 121. When incident on mirror 122, the external light reflected off drive lens 121A and fixed lens 121B may possibly be projected onto windshield 220 to be visually recognized by viewer D. This is undesirable because view of viewer D who drives vehicle 200 can be disturbed.

In the present disclosure, the respective incident surfaces and the respective emission surfaces of the lens elements of lens group 121 are, as shown in FIG. 5, downwardly inclined relative to reference beam Lc. In other words, the lens elements of lens group 121 are inclined relative to reference beam Lc. As such, the external light such as sunlight can be reflected downwardly of mirror 122, thereby being prevented from entering eyepoint region 300. Here it is preferable that each of the lens elements of lens group 121 be inclined at such an angle to reference beam Lc that the external light that enters along reference beam Lc and reflects off the incident surface or the emission surface is not incident on mirror 122. More preferably, the angle is such that external light that enters lens group 121 from mirror 122 and reflects off the incident surface or the emission surface of each of the lens elements of lens group 121 is not incident on mirror 122. The inclination of each of the lens elements of lens group 121 relative to reference beam Lc means that the optical refracting interface of each of the lens elements of lens group 121 is not level with a plane perpendicular to reference beam Lc.

The emission surface of drive lens 121A is provided to face more downwardly than the incident surface of drive lens 121A. This means that drive lens 121A is of wedge shape along its Y-axis. With drive lens 121A being of wedge-shaped section along its Y-axis, an optical path length of light that passes through an upper portion of drive lens 121A is greater than an optical path length of light that passes through a lower portion of drive lens 121A. In other words, image light that is emitted from display device 110 and reaches mirror 122 can have its optical path length varied according to positions along the Y-axis. In this way, eccentric field curvature that takes place at mirror 122 can be corrected satisfactorily.

It is to be noted here that an antireflective coating of thin multilayer structure is applied to the respective incident surfaces and the respective emission surfaces of drive lens 121A and fixed lens 121B. The respective surfaces of drive lens 121A and fixed lens 121B can thus have reduced reflectivities. The antireflective coating that is used may be a fine periodic structure such as a subwavelength structure (SWS). With the antireflective coating applied to the respective incident surfaces and the respective emission surfaces of the lens elements of lens group 121, viewer D can visually recognize satisfactory virtual image I without a decline in transmittance of an image that is displayed by display device 110. Moreover, even in cases where external light such as sunlight reaches eyepoint region 300 after multiple reflection between the incident surface and the emission surface of lens group 121, brightness can be reduced sufficiently.

It is to be noted here that drive lens 121A is disposed above a lower edge of the reflection surface of mirror 122. As such, head-up display 100 can be made thin vertically of vehicle 200. Fixed lens 121B also is disposed above the lower edge of the reflection surface of mirror 122. As such, head-up display 100 can be made thin vertically of vehicle 200.

A description is provided next of mirror 122. Mirror 122 is positioned forwardly of lens group 121 in vehicle 200. Mirror 122 reflects a beam that is emitted from lens group 121 toward windshield 220. The reflection surface of mirror 122 is eccentrically disposed. The reflection surface of mirror 122 here is of concave shape. This means that mirror 122 magnifies light incident from lens group 121 for projection onto windshield 220. In this way, image 111 displayed by display device 110 can be magnified into virtual image I for visual recognition by viewer D. Mirror 122 is shaped to have a free-form surface. This is for the purpose of correcting virtual image distortion that is caused by reflection. Consequently, viewer D can see satisfactory virtual image I throughout eyepoint region 300.

[1-2. Operation]

A description is provided next of operation of head-up display 100 of the present disclosure with reference to FIG. 4 and FIGS. 8A to 11B. Drive lens 121A of lens group 121 is shifted to change its distance from display device 110. More specifically, when a beam that reaches the center of eyepoint region 300 of viewer D and corresponds to the center of virtual image I is regarded as reference beam Lc, drive lens 121A is shifted along reference beam Lc. In this way, a distance (sight distance) from viewer D to virtual image I can be changed. As shown in FIG. 4, shifting that reduces the distance between drive lens 121A and display device 110 results in an increased sight distance. This is because the shifting that reduces the distance between drive lens 121A and display device 110 leads to a higher magnification of projection optical system 120. Here a field of view is increased as shown in FIGS. 8B and 9A when virtual image I is seen from viewer D. In other words, in cases where image 111 has its size fixed on display device 110 before and after shifting of drive lens 121A, virtual image I for visual recognition by viewer D changes in size (refer to FIG. 9A).

In order for the field of view to be fixed before and after shifting of drive lens 121A that is intended to increase the sight distance, head-up display 100 of the present disclosure decreases the size of image 111 displayed on display device 110 according to the shifting of drive lens 121A (refer to FIG. 9B). In this case, controller 150 obtains a driving amount of lens drive unit 130 to determine a size of image 111 for display on display device 110. Here a size change amount of display image 111 is in proportion to the driving amount of lens drive unit 130.

It is to be noted that any sizes of images that are displayed on display device 110 are achieved by use of, among pixels that form a screen of display device 110, pixels that are used for content display.

Figure 10A:
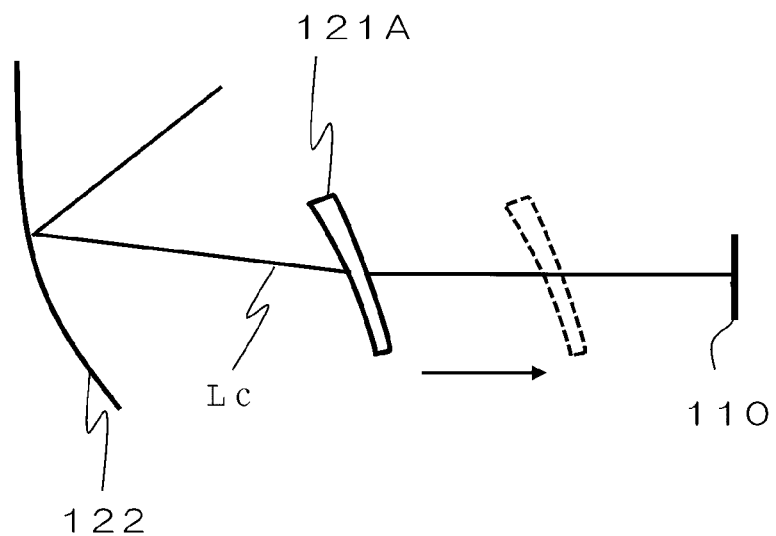
FIG. 10A illustrates an optical path of a display image before the drive lens is shifted in the head-up display of the present disclosure.
Figure 10B:
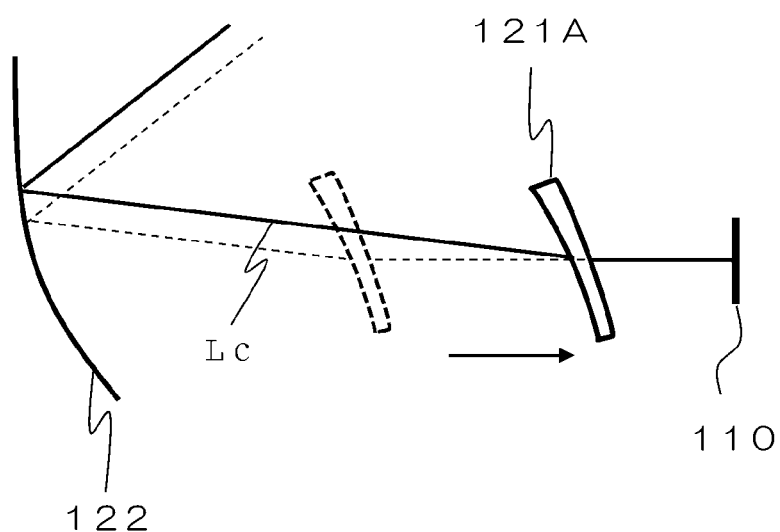
FIG. 10B illustrates an optical path of the display image after the drive lens is shifted in the head-up display of the present disclosure.

As shown in FIGS. 10A and 10B, the optical path of reference beam Lc incident on mirror 122 shifts as drive lens 121A that is disposed to incline relative to reference beam Lc is shifted. Accordingly, a depression angle (from a horizontal line of sight of viewer D to a display position of virtual image I) varies during visual recognition of virtual image I by viewer D (refer to FIG. 11A).

To prevent this depression angle variation, display image 111 has its position shifted along the Y-axis in the display area of display device 110 as shown in FIG. 11B. In this case, controller 150 that controls display device 110 obtains a driving amount of lens drive unit 130 to determine a display position of image 111 for display on display device 110. Here a shift amount of display image 111 is in proportion to the driving amount of lens drive unit 130. For prevention of the depression angle variation, mirror drive unit 140 may be driven to change the angle of mirror 122, thereby changing an angle at which reference beam Lc is incident on mirror 122. The prevention of depression angle variation may be achieved, instead of by the angle change of mirror 122, by shifting of fixed lens 121B along the Y-axis with respect to reference beam Lc. In this way, a position of incidence on drive lens 121A can be shifted, whereby reference beam Lc can have its incident position fixed on mirror 122. The prevention of depression angle variation may be achieved by any combination of or a combination of all of the above-described shifting of the display position of image 111, the angle change of mirror 122, and the shifting of fixed lens 121B.

In this way, even in cases where the distance (sight distance) from viewer D to virtual image I is changed, the field of view and the depression angle can be kept fixed.

[1-3. Effects and Others]

Head-up display 100 of the present disclosure includes display device 110 (an example of the display device) and projection optical system 120. Display device 110 displays an image. Projection optical system 120 has, in order from display device 110 along the optical path, lens group 121 and mirror 122 and projects the image displayed on display device 110 for viewer D. Lens group 121 has drive lens 121A and fixed lens 121B. Drive lens 121A is disposed to incline relative to reference beam Lc. The display-device-110 end incident surface of drive lens 121A is shaped concavely along the X-axis to face display device 110. The incident surface of drive lens 121A has the smaller curvature along the Y-axis than along the X-axis.

An imaging optical system of head-up display 100 forms a real image (first image surface) displayed by display device 110 as virtual image I (second image surface) for visual recognition by viewer D via mirror 122, lens group 121, and windshield 220. In other words, with use of lens group 121 and mirror 122, the imaging optical system of the head-up display 100 establishes a conjugate relationship between the first image surface and the second image surface via windshield 220. Reference beam Lc of head-up display 100, that is to say, the beam corresponding to the center of the second image surface passes through the respective incident surfaces and the respective emission surfaces of drive lens 121A and fixed lens 121B.

Head-up display 100 according to the first exemplary embodiment projects the image displayed on display device 110 onto windshield 220 to allow viewer D to visually recognize virtual image I. Thus, the image displayed on display device 110 can be recognized visually by viewer D with forward view of viewer D not obstructed.

While being of small-size, head-up display 100 of the present disclosure that can be realized is capable of satisfactory correction of image distortion in entire eyepoint region 300.

Head-up display 100 of the present disclosure includes drive lens 121A, so that the sight distance of virtual image I can be changed.

Drive lens 121A has negative refractive power along the X-axis. As such, a beam that is emitted from display device 110 and enters lens group 121 can have its expansion suppressed along the X-axis. Accordingly, head-up display 100 can show virtual image I having a satisfactory contrast characteristic.

Fixed lens 121B is of negative-meniscus shape, concavely facing display device 110 along the X-axis. As such, a beam emitted from display device 110 can be incident on the lens incident surface of lens group 121 at an angle closer to a right angle. This enables eccentric distortion to affect less.

The emission surface of each of the lens elements of lens group 121 is shaped into a free-form surface. Specifically, each of the lens elements of lens group 121 is not symmetrical about the X-axis. As such, lens group 121 can satisfactorily correct asymmetrical distortion that takes place at windshield 220.

Drive lens 121A according to the first exemplary embodiment is a concave lens as a whole. In other words, drive lens 121A is an optical element that functions as a negative power lens along both the X-axis and the Y-axis.

Fixed lens 121B according to the first exemplary embodiment is a convex lens as a whole. In other words, fixed lens 121B is an optical element that functions as a positive power lens along both the X-axis and the Y-axis.

The incident surface of drive lens 121A according to the first exemplary embodiment is concave along the X-axis. The incident surface of drive lens 121A has the smaller curvature along the Y-axis than along the X-axis. With the curvature being greater along the X-axis, light of image 111 is incident at an increased angle even on a portion far away from a center of the incident surface along the X-axis of drive lens 121A. As such, degradation of an optical characteristic in the portion far away from the center can be suppressed along the X-axis of drive lens 121A. With drive lens 121A particularly having a greater X-axis length than its Y-axis length, degradation of an optical characteristic in a portion far away from a center of drive lens 121A is generally greater along the X-axis than along the Y-axis. Because of its incident surface that has the smaller curvature along the Y-axis than along the X-axis, drive lens 121A having the greater X-axis length than the Y-axis length can have the degradation of the optical characteristic suppressed more effectively. It is to be noted that the same goes for a lens element having a length that corresponds to an X-axis of virtual image I and is greater than its length corresponding to a Y-axis of virtual image I, so that the lengths of the outside shape of the lens element are not limiting.

Drive lens 121A according to the first exemplary embodiment has the emission surface that is convex along the X-axis. As such, its incident surface can be shaped concavely to have the greater curvature along the X-axis. Moreover, its emission surface has the smaller curvature along the X-axis than the incident surface's curvature along the X-axis. Furthermore, its emission surface has the smaller curvature along the Y-axis than along the X-axis. Thus, drive lens 121A can have such an optical characteristic as to be, as a whole, the concave lens along the X-axis and the Y-axis.

Second Exemplary Embodiment

Figure 12:
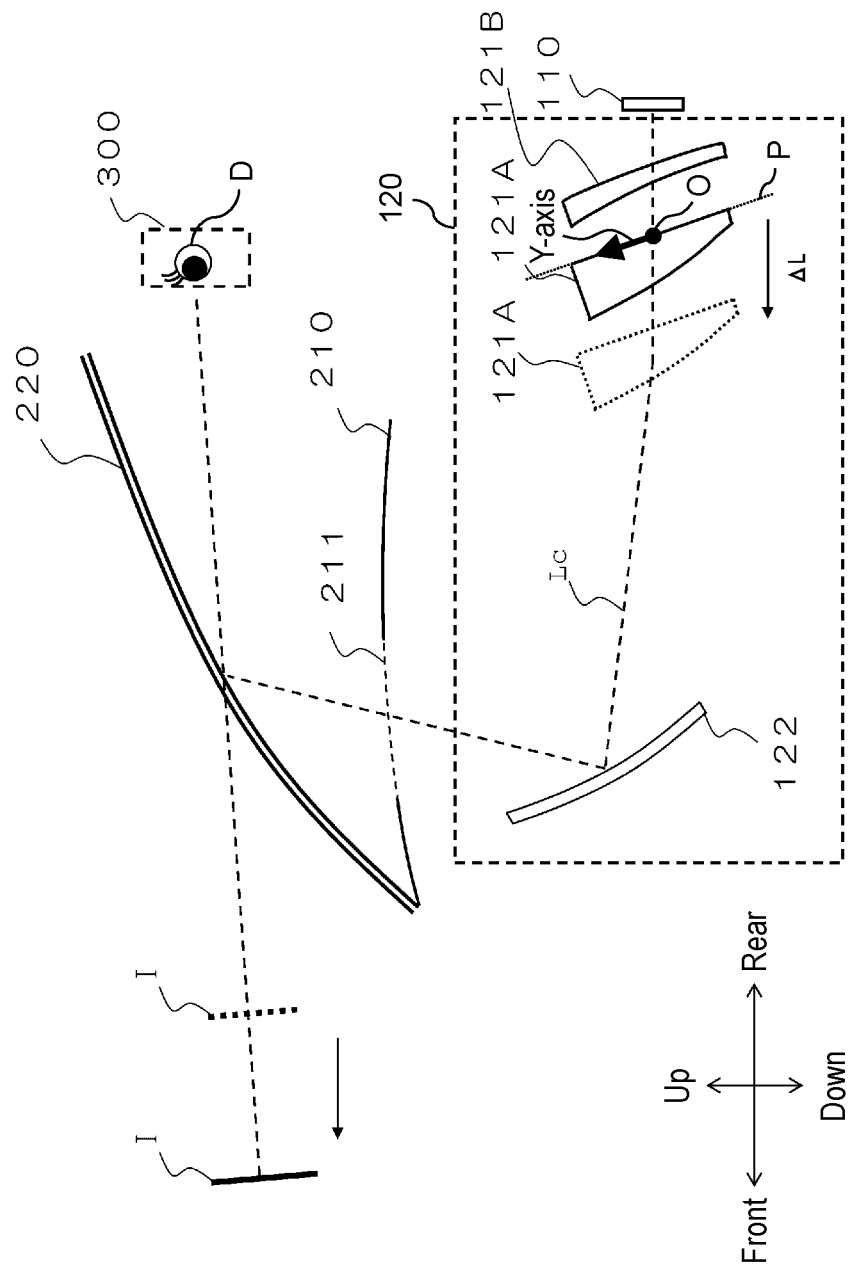
FIG. 12 is a schematic diagram illustrating structure of a head-up display according to a second exemplary embodiment.

Head-up display 100 according to the second exemplary embodiment differs from that of the first exemplary embodiment in that lens group 121 is formed of drive lens 121A that has a converging effect, and fixed lens 121B that has a diverging effect. With reference to FIG. 12, the following description is centered on those different from the first exemplary embodiment, and description of similar structures is omitted.

[2-1. Structure]

FIG. 12 is a schematic diagram illustrating structure of projection optical system 120 of head-up display 100 according to the second exemplary embodiment.

As shown in FIG. 12, projection optical system 120 has lens group 121 and mirror 122.

In the second exemplary embodiment, drive lens 121A is a free-form surface lens having different curvatures along an X-axis and a Y-axis, respectively. A point of intersection of reference beam Lc and an incident surface of drive lens 121A is regarded as origin O. A plane tangent to the incident surface of drive lens 121A at origin O is regarded as tangent plane P. A straight line including a point of intersection of reference outer beam Lo and tangent plane P, and origin O is regarded as the X-axis, as shown in FIG. 6. A straight line perpendicular to the X-axis on tangent plane P is regarded as the Y-axis. The display-device 110-end surface (incident surface) of drive lens 121A is shaped convexly along the X-axis to convexly face display device 110. However, the incident surface of drive lens 121A is not limited to the convex surface and may be shaped concavely to concavely face a liquid crystal display. A mirror 122-end surface (emission surface) of drive lens 121A is shaped convexly along the X-axis to convexly face mirror 122. The incident surface of drive lens 121A has the smaller curvature along the Y-axis than the drive-lens emission surface's curvature along the X-axis. In the second exemplary embodiment, the incident surface of drive lens 121A is shaped to have no refractive power along the Y-axis. In the second exemplary embodiment, the emission surface of drive lens 121A is shaped convexly along the Y-axis to convexly face mirror 122. The emission surface of drive lens 121A is provided to face more downwardly than the incident surface of drive lens 121A. This means that drive lens 121A is of wedge shape along its Y-axis.

Fixed lens 121B is a free-form surface lens having different curvatures along an X-axis and a Y-axis, respectively. A display-device 110-end surface (incident surface) of fixed lens 121B is shaped concavely along the X-axis to concavely face display device 110. The incident surface of fixed lens 121B is shaped concavely along the Y-axis to concavely face display device 110. A mirror 122-end surface (emission surface) of fixed lens 121B is shaped concavely along the X-axis to concavely face mirror 122. The emission surface of fixed lens 121B has the smaller curvature along the Y-axis than along the X-axis. In the example of the second exemplary embodiment, the emission surface of fixed lens 121B is shaped to have no refractive power along the Y-axis. It is to be noted that the emission surface of fixed lens 121B may convexly or concavely face mirror 122 along the Y-axis to have a smaller curvature along the Y-axis than along the X-axis. The incident surface of fixed lens 121B may convexly face display device 110. Alternatively, the incident surface of fixed lens 121B may face display device 110 in a locally concave, convex or planar manner.

Mirror 122 magnifies light incident from lens group 121 for projection onto windshield 220. A reflection surface of mirror 122 is of concave shape. As such, image 111 displayed by display device 110 can be magnified into virtual image I for visual recognition by viewer D. The reflection surface of mirror 122 is shaped into a free-form surface. This is for the purpose of correcting virtual image distortion that is caused by reflection. Consequently, viewer D can see satisfactory virtual image I throughout eyepoint region 300.

[2-2. Operation]

Drive lens 121A according to the second exemplary embodiment is shifted to change its distance from display image 111. In this way, a distance (sight distance) from viewer D to virtual image I can be changed. As shown in FIG. 12, shifting that increases the distance between drive lens 121A and display device 110 results in an increased sight distance. This is because the shifting that increases the distance between drive lens 121A and display device 110 leads to a higher magnification of projection optical system 120.

[2-3. Effects and Others]

Head-up display 100 of the present disclosure includes drive lens 121A, so that the sight distance of virtual image I can be changed.

Drive lens 121A according to the second exemplary embodiment is a convex lens as a whole. In other words, drive lens 121A is an optical element that functions as a positive power lens along both the X-axis and the Y-axis. Fixed lens 121B is a concave lens as a whole. In other words, fixed lens 121B is an optical element that functions as a negative power lens along both the X-axis and the Y-axis. As such, drive lens 121A can be partially responsible for positive power required at mirror 122.

(Preferable Conditions)

A description is provided hereinafter of conditions preferably met by head-up display 100 of the present disclosure. While the plurality of preferable conditions is specified for head-up display 100 of each of the exemplary embodiments, a structure that satisfies all of the plurality of conditions is most preferable. However, in cases where the conditions are satisfied individually, any optical systems having corresponding effects can be obtained.

Head-up display 100 of the present disclosure includes display device 110 that displays an image, and projection optical system 120 that projects the image displayed on display device 110. Projection optical system 120 has, in order from display device 110 along an optical path, lens group 121 and mirror 122.

Lens group 121 includes drive lens 121A, and drive lens 121A is shifted to change its distance from display device 110. In this way, virtual image I can have its sight distance shifted during visual recognition by viewer D.

It is preferable that lens group 121 have fixed lens 121B. This enables satisfactory correction of eccentric field curvature that takes place at drive lens 121A and mirror 122.

In lens group 121, the lens element that changes its distance from display device 110 is preferably disposed nearer to mirror 122 in the optical path extending from display device 110 toward mirror 122. In this way, fixed lens 121B can be disposed in a small size.

Drive lens 121A and fixed lens 121B preferably have different powers. The power of drive lens 121A can thus be increased, thereby achieving a reduced shift amount of drive lens 121A that is necessary for shifting the sight distance of virtual image I.

Drive lens 121A is preferably disposed to incline relative to reference beam Lc. Accordingly, even in cases where external light such as sunlight enters head-up display 100, stray light that results from reflection at drive lens 121A and is visually recognized by viewer D can be suppressed.

Fixed lens 121B is preferably disposed to incline relative to reference beam Lc. Accordingly, even in cases where external light such as sunlight enters head-up display 100, stray light that results from reflection at fixed lens 121B and is visually recognized by viewer D can be suppressed.

The respective incident surfaces and the emission surfaces of the lens elements of lens group 121 in head-up display 100 of the present disclosure are preferably inclined relative to a plane perpendicular to reference beam Lc. As such, light that enters along reference beam Lc and is reflected is emitted in a direction different from reference beam Lc. Drive lens 121A is of wedge-shaped section in the plane perpendicular to the X-axis. This means that a center (optical center) of the drive lens's curved shape along the Y-axis is positioned away from the center of drive lens 121A, for example, outwardly of drive lens 121A. In a portion away from an optical center of a concave lens, an optical path length is generally greater than an optical path length in a portion nearer to the optical center, so that an optical characteristic is uneven in a surface of the lens element. On the other hand, drive lens 121A according to the first exemplary embodiment varies the optical path length along the Y-axis. Characteristics of other optical elements are thus canceled, whereby an optical characteristic of the entire imaging optical system using lens group 121 can be corrected.

In head-up display 100 of the present disclosure, it is preferable that according to a position of drive lens 121A, the position of image 111 be shifted along the Y-axis in the display area of display device 110. The depression angle of virtual image I that is visually recognized by viewer D can thus be kept fixed even when drive lens 121A is shifted.

In head-up display 100 of the present disclosure, the size of image 111 displayed by display device 110 is preferably changed according to the position of drive lens 121A. Virtual image I that is visually recognized by viewer D thus can have its size fixed even when drive lens 121A is shifted.

Head-up display 100 of the present disclosure preferably satisfies the following condition (1):

$$1 < \Delta D/\Delta L \quad (1)$$

where

ΔD is 1/Z1−1/Z2 (diopter),

Z1 is a sight distance (m) of virtual image I before drive lens 121A is shifted, Z2 is a sight distance (m) of virtual image I after drive lens 121A is shifted, and ΔL is a shift amount (m) of drive lens 121A.

The condition (1) is a condition that defines a relationship between the shift amount of the lens that is driven to change the sight distance of virtual image I and a shift amount of virtual image I. With this condition satisfied, the shift amount of drive lens 121A necessary for changing the distance of virtual image I can be set appropriately, so that size reduction of projection optical system 120 can be achieved. At below the lower limit of the condition (1), the shift amount of drive lens 121A necessary for shifting the display position of virtual image I increases. Accordingly, projection optical system 120 increases in size.

The above effect can be enhanced further when the following condition (1)' is satisfied.

$$1 < \Delta D/\Delta L < 50 \quad (1)'$$

At above the upper limit of the condition (1)', the power of drive lens 121A increases, so that eccentric field curvature variations associated with shifting of drive lens 121A become difficult to suppress.

The above effect can be enhanced further when the following condition (1)" is satisfied.

$$2 < \Delta D/\Delta L < 30 \quad (1)''$$

The above effect can be enhanced further when the following condition (1)'" is satisfied.

$$3 < \Delta D/\Delta L < 20 \quad (1)'''$$

The above effect can be enhanced further when the following condition (1)"" is satisfied.

$$4 < \Delta D/\Delta L < 10 \quad (1)''''$$

Head-up display 100 of the present disclosure preferably satisfies the following condition (2):

$$0.1 < |(1-(1/\beta F)^2) \times (1/\beta R)^2| < 3 \quad (2)$$

where

βF is a lateral magnification of drive lens 121A when the sight distance is shortest, and βR is a lateral magnification of the lens group disposed between drive lens 121A and display device 110 when the sight distance is shortest.

The condition (2) is a condition that defines a relationship between the lateral magnification of drive lens 121A to change the sight distance of virtual image I and the lateral magnification of the undriven lens disposed between the drive lens and display device 110. With this condition (2) satisfied, the shift amount of drive lens 121A with respect to the shift amount of virtual image I can be set appropriately. At below the lower limit of the condition (2), the shift amount of virtual image I decreases with respect to the shift amount of drive lens 121A, so that an increased space is required for shifting of drive lens 121A. Accordingly, projection optical system 120 increases in size. On the other hand, at above the upper limit of the condition (2), the shift amount of virtual image I increases too much with respect to the shift amount of drive lens 121A, so that a position error is greater when caused.

The above effect can be enhanced further when the following condition (2)' is satisfied.

$$0.2 < |(1-(1/\beta F)^2) \times (1/\beta R)^2| < 2 \quad (2)'$$

The above effect can be enhanced further when the following condition (2)" is satisfied.

$$0.3 < |(1-(1/\beta F)^2) \times (1/\beta R)^2| < 1.5 \quad (2)''$$

Head-up display 100 of the present disclosure preferably satisfies the following condition (3):

$$\Delta L/\Delta M < 30 \quad (3)$$

where

ΔM is the shift amount [m] of display image 111 in the display area of display device 110.

The condition (3) is a condition that defines a relationship between the shift amount of the lens that is driven to change the sight distance of virtual image I and the display image's shift amount in the display device's display area that is necessary for a fixed depression angle of virtual image I. At above the upper limit of the condition (3), the shift amount of drive lens 121A increases, so that it is difficult to provide small-size head-up display 100.

The above effect can be enhanced further when the following condition (3)' is satisfied.

$$3 < \Delta L/\Delta M < 30 \quad (3)'$$

At below the lower limit of the condition (3)', the power of drive lens 121A needs to be increased in order to decrease the shift amount of drive lens 121A, so that eccentric field curvature variations associated with driving of drive lens 121A become difficult to suppress.

The above effect can be enhanced further when the following condition (3)" is satisfied.

$$4 < \Delta L/\Delta M < 20 \quad (3)''$$

The above effect can be enhanced further when the following condition (3)" is satisfied.

$$5 < \Delta L/\Delta M < 15 \quad (3)'''$$

Head-up display 100 of the present disclosure preferably satisfies the following condition (4):

$$\Delta N < 2 \quad (4)$$

where

ΔN is X1/X2

X1 is a horizontal size of an image that is displayed in the display area of display device 110 before drive lens 121A is shifted, and X2 is a horizontal size of the image displayed in the display area of display device 110 after drive lens 121A is shifted.

The condition (4) is a condition that defines size adjustment of the display device's display image that is necessary for a fixed field of view of the virtual image after virtual image I is shifted. At above the upper limit of the condition (4), resolution of display image 111 on display device 110 decreases, so that it is difficult to allow viewer D to visually recognize satisfactory virtual image I.

The above effect can be enhanced further when the following condition (4)' is satisfied.

$$\Delta N < 1.8 \quad (4)'$$

The above effect can be enhanced further when the following condition (4)″ is satisfied.

$$\Delta N < 1.7 \qquad (4)''$$

When drive lens 121A is shifted to change the sight distance of virtual image I, head-up display 100 of the present disclosure preferably distorts a shape of display image 111 on display device 110 according to the shifting of drive lens 121A. Electronic correction can thus be made of eccentric distortion that takes place when drive lens 121A is shifted.

Other Exemplary Embodiments

The first and second exemplary embodiments have been described above as being illustrative of the technique disclosed in the present application. However, the technique of the present disclosure is not limited to these exemplary embodiments and is also applicable to exemplary embodiments including modifications, replacements, additions, and omissions. Moreover, the constituent elements described in the first and second exemplary embodiments can be combined in a new exemplary embodiment.

In each of the first and second exemplary embodiments, one drive lens 121A and one fixed lens 121B are shown as an example of lens group 121 that is provided between display device 110 and mirror 122. However, lens group 121 is not limited to such a combination. For example, lens group 121 may be such that drive lens 121A formed of a plurality of lens elements and fixed lens 121B formed of a plurality of lens elements are disposed between display device 110 and mirror 122 or may be such that fixed lens 121B is disposed between drive lens 121A and mirror 122.

In each of the first and second exemplary embodiments, the one drive lens is shifted to shift the sight distance of virtual image I. However, not less than two drive lenses may be shifted separately.

In the example described in each of the first and second exemplary embodiments, lens group 121 is formed of the two lens elements, namely, drive lens 121A and fixed lens 121B. However, lens group 121 may be formed only of drive lens 121A. In this case, drive lens 121A has only to be of the same shape as drive lens 121A of the first exemplary embodiment. This means that drive lens 121A is a negative power lens element as a whole.

In each of the first and second exemplary embodiments, drive lens 121A undergoes parallel shifting to shift the sight distance of virtual image I; however, drive lens 121A may be shifted while being inclined.

In each of the first and second exemplary embodiments, when drive lens 121A is shifted, image 111 displayed on display device 110 is shifted so that the depression angle of virtual image I is fixed. However, fixed lens 121B may be shifted at the same time or mirror 122 may be rotated.

In the example of each of the first and second exemplary embodiments, the incident surface of drive lens 121A is shaped to have no refractive power along the Y-axis. It is to be noted that the incident surface of drive lens 121A may concavely face display device 110 to have a smaller curvature along the Y-axis than along the X-axis. As an alternative, the incident surface of drive lens 121A may convexly face display device 110. As another alternative, the incident surface of drive lens 121A may face display device 110 in a locally concave, convex or planar manner. In the first exemplary embodiment, the emission surface of drive lens 121A concavely faces mirror 122 along the Y-axis. However, this emission surface may convexly face mirror 122 along the Y-axis.

In the example of each of the first and second exemplary embodiments, the emission surface of fixed lens 121B is shaped to have no refractive power along the Y-axis. It is to be noted that the emission surface of fixed lens 121B may convexly or concavely face mirror 122 along the Y-axis to have a smaller curvature along the Y-axis than along the X-axis. The incident surface of fixed lens 121B may convexly face display device 110. Alternatively, the incident surface of fixed lens 121B may face display device 110 in a locally concave, convex or planar manner.

In each of the first and second exemplary embodiments, one mirror 122 is disposed in projection optical system 120. However, not less than two mirrors may be disposed. The additional mirror may be disposed forwardly of mirror 122 in a vehicle or may be disposed inwardly or outwardly of mirror 122 (along a direction perpendicular to a paper surface of FIG. 4) in the vehicle.

In each of the first and second exemplary embodiments, projection optical system 120 includes the only lens elements in lens group 121 that is disposed between display device 110 and mirror 122. However, head-up display 100 is not structurally limited to this. For example, an additional lens may be disposed between mirror 122 and windshield 220.

Mirror 122 of head-up display 100 that is described in each of the first and second exemplary embodiments is of rotationally asymmetrical shape but is not limited to this. Mirror 122 may, for example, have a so-called saddle-shaped surface that has curvatures of different signs along an X-axis and a Y-axis, respectively.

The surface of each of the lens elements of lens group 121 in each of the first and second exemplary embodiments is not limited to the free-form surface in shape. That surface may be shaped to be, for example, toroidal, anamorphic or cylindrical, and lenses having these shapes may be disposed eccentrically relative to reference beam Lc.

The reflection surface of mirror 122 in each of the first and second exemplary embodiments is not limited to the free-form surface in shape. The reflection surface of mirror 122 may be shaped to be spherical, aspherical, toroidal or anamorphic, and a mirror of such shape may be disposed eccentrically relative to reference beam Lc.

In each of the first and second exemplary embodiments, lens group 121 is the combination of drive lens 121A and fixed lens 121B of different powers. However, lens group 121 may be a combination of drive lens 121A and fixed lens 121B that have the same power.

Because the above exemplary embodiments are intended to be illustrative of the technique of the present disclosure, various modifications, replacements, additions, omissions, and others can be made within the scope of the claims or equivalents of the claims.

NUMERICAL EXAMPLES

A description is provided hereinafter of Numerical Examples 1 and 2 in which respective head-up displays 100 of the first and second exemplary embodiments are embodied, respectively. In data of Numerical Examples, all lengths are in the unit of "mm", and all angles are in the unit of "s". In Numerical Examples, free-form surfaces are each defined by the following expressions:

$$z = \frac{cr^2}{1+\sqrt{1-(1+k)c^2r^2}} + \sum_{m,n} C_j x^m y^n \quad \text{[Expression 1]}$$

$$j = \frac{(m+n)^2 + m + 3n}{2} + 1 \quad \text{[Expression 2]}$$

where z is a sag at point (x, y) from axes that define a surface, r is a radius of curvature at an origin of the axes defining the surface, c is a curvature at the origin of the axes defining the surface, k is a conic constant corresponding to polynomial coefficient Ci, and Cj (j>1) is a coefficient of monomial $x^m y^n$ with m and n being integers of not less than 0.

In Numerical Examples, a reference coordinate origin is the center of image 111 displayed on display device 110, and a long side and a short side of display device 110 are respectively defined as the X-axis and the Y-axis, while a line perpendicular to the screen of display device 110 is defined as a Z-axis.

In eccentricity data of Numerical Examples, ADE refers to an amount by which mirror 122 is rotated around the X-axis from the Z-axis toward the Y-axis. BDE refers to an amount by which the mirror is rotated around the Y-axis from the X-axis toward the Z-axis. CDE refers to an amount by which the mirror is rotated around the Z-axis from the X-axis toward the Y-axis.

Numerical Example 1

Numerical Example 1 shows the structure of head-up display 100 of the first exemplary embodiment. FIG. 13 shows eccentricity data of projection optical system 120 before virtual image I is shifted, while FIG. 14 shows eccentricity data of projection optical system 120 after virtual image I is shifted. FIG. 15 shows respective radii of curvature of the surfaces in projection optical system 120. FIGS. 16 to 18 show polynomial free-form surface coefficients of the surfaces in projection optical system 120.

In Numerical Example 1, before virtual image I is shifted, virtual image I is 306.1 mm along its X-axis and 92.0 mm along its Y-axis in size, and its distance (sight distance) from viewer D is 2,200.0 mm. After virtual image I is shifted, virtual image I is 556.5 mm along its X-axis and 167.3 mm along its Y-axis in size, and its distance (sight distance) from viewer D is 4,000.0 mm.

Numerical Example 2

Numerical Example 2 shows the structure of head-up display 100 of the second exemplary embodiment. FIG. 19 shows eccentricity data of projection optical system 120 before virtual image I is shifted, while FIG. 20 shows eccentricity data of projection optical system 120 after virtual image I is shifted. FIG. 21 shows respective radii of curvature of the surfaces in projection optical system 120. FIGS. 22 to 24 show polynomial free-form surface coefficients of the surfaces in projection optical system 120.

In Numerical Example 2, before virtual image I is shifted, virtual image I is 306.1 mm along its X-axis and 92.0 mm along its Y-axis in size, and its distance (sight distance) from viewer D is 2,200.0 mm. After virtual image I is shifted, virtual image I is 556.5 mm along its X-axis and 167.3 mm along its Y-axis in size, and its distance (sight distance) from viewer D is 4,000.0 mm.

Table 1 below shows values obtained by specific application of the values of Numerical Examples to the conditional expressions (1) to (4).

TABLE 1

|  | Example 1 | Example 2 |
|---|---|---|
| Conditional expression (1) | 5.84 | 5.84 |
| Conditional expression (2) | 0.39 | 0.90 |
| Conditional expression (3) | 8.27 | 7.79 |
| Conditional expression (4) | 1.59 | 1.47 |

INDUSTRIAL APPLICABILITY

The present disclosure is applicable to a head-up display that uses a dioptric system such as a lens. Specifically, the present disclosure is applicable to a head-up display that is used in a vehicle.

REFERENCE MARKS IN THE DRAWINGS 100 head-up display
110 display device
111 image
120 projection optical system
121 lens group
121A drive lens
121B fixed lens
122 mirror
130 lens drive unit
140 mirror drive unit
170 camera
200 vehicle
210 dashboard
211 opening
220 windshield (reflecting member)
300 eyepoint region
D viewer
I virtual image
Lc reference beam
Lo reference outer beam
Li reference inner beam

The invention claimed is:

1. An image projector that projects an image onto a transmissive reflecting member to allow a viewer to visually recognize a virtual image, the image projector comprising:
   a display device that displays an image; and
   a projection optical system that projects onto the transmissive reflecting member the image displayed on the display device, the projection optical system including a lens group that includes at least one lens element,
   wherein the lens group includes at least one drive lens that shifts along an optical path to change the distance from the drive lens to the display device, and
   wherein the image projector satisfies the following condition (1):

$$1 < \Delta D/\Delta L < 50 \quad (1)$$

where
$\Delta D$ is $1/Z1 - 1/Z2$,
Z1 is a sight distance of a virtual image before the drive lens is shifted,
Z2 is a sight distance of the virtual image after the drive lens is shifted, and
$\Delta L$ is a shift amount of the drive lens.

2. The image projector according to claim 1, wherein:
the lens group includes, between the drive lens and the display device, a fixed lens group that is moveless; and
the image projector satisfies the following condition (2):

$$0.1 < (1-(1/\beta F)^2) \times (1/\beta R)^2 < 3 \quad (2)$$

where
$\beta F$ is a lateral magnification of the drive lens, and
$\beta R$ is a lateral magnification of the fixed lens group disposed between the drive lens and the display device.

3. The image projector according to claim 1 or 2, wherein the drive lens shifts in a direction that reduces the distance from the drive lens to the display device to increase the sight distance.

4. The image projector according to claim 1 or 2, wherein the drive lens shifts in a direction that increases the distance from the drive lens to the display device to increase the sight distance.

5. The image projector according to any one of claims 1 to 2, wherein the projection optical system further includes a mirror that reflects toward the transmissive reflecting member light emitted from the lens group.

6. An image projector that projects an image onto a transmissive reflecting member to allow a viewer to visually recognize a virtual image, the image projector comprising:
a display device that displays an image; and
a projection optical system that projects onto the transmissive reflecting member the image displayed on the display device, the projection optical system including a lens group that includes at least one lens element,
wherein the lens group includes at least one drive lens that shifts along an optical path to change the distance from the drive lens to the display device, and
wherein the image projector satisfies the following condition (1):

$$1 < \Delta D/\Delta L \quad (1)$$

where
$\Delta D$ is $1/Z1 - 1/Z2$,
Z1 is a sight distance of a virtual image before the drive lens is shifted,
Z2 is a sight distance of the virtual image after the drive lens is shifted, and
$\Delta L$ is a shift amount of the drive lens, and
wherein the image projector satisfies the following condition (3):

$$\Delta L/\Delta M < 30 \quad (3)$$

where
$\Delta M$ is a shift amount of the image displayed in a display area of the display device.

7. An image projector that projects an image onto a transmissive reflecting member to allow a viewer to visually recognize a virtual image, the image projector comprising:
a display device that displays an image; and
a projection optical system that projects onto the transmissive reflecting member the image displayed on the display device, the projection optical system including a lens group that includes at least one lens element,
wherein the lens group includes at least one drive lens that shifts along an optical path to change the distance from the drive lens to the display device, and
wherein the image projector satisfies the following condition (1):

$$1 < \Delta D/\Delta L \quad (1)$$

where
$\Delta D$ is $1/Z1 - 1/Z2$,
Z1 is a sight distance of a virtual image before the drive lens is shifted,
Z2 is a sight distance of the virtual image after the drive lens is shifted, and
$\Delta L$ is a shift amount of the drive lens, and
wherein the image projector satisfies the following condition (4):

$$\Delta N < 2 \quad (4)$$

where
$\Delta N$ is X1/X2
X1 is a horizontal size of the image displayed in the display device before the drive lens is shifted, and
X2 is a horizontal size of the image displayed in the display device after the drive lens is shifted.

* * * * *